(12) United States Patent
Riley et al.

(10) Patent No.: US 7,742,211 B2
(45) Date of Patent: Jun. 22, 2010

(54) SENSING AND CORRECTING ANGULAR ORIENTATION OF HOLOGRAPHIC MEDIA IN A HOLOGRAPHIC MEMORY SYSTEM BY PARTIAL REFLECTION, THE SYSTEM INCLUDING A GALVANO MIRROR

(75) Inventors: Brian S. Riley, Firestone, CO (US); Aaron Wegner, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 164 days.

(21) Appl. No.: 11/440,371

(22) Filed: May 25, 2006

(65) Prior Publication Data

US 2006/0279824 A1    Dec. 14, 2006

Related U.S. Application Data

(60) Provisional application No. 60/684,531, filed on May 26, 2005.

(51) Int. Cl.
*G03H 1/22*    (2006.01)
(52) U.S. Cl. .................. 359/32; 359/22; 369/44.32; 369/53.19; 369/103
(58) Field of Classification Search .............. 359/1, 359/22, 32, 24, 25; 369/44.32, 53.19, 103
See application file for complete search history.

(56) References Cited

U.S. PATENT DOCUMENTS

| | | | |
|---|---|---|---|
| 4,478,481 A * | 10/1984 | Fusek et al. ................ 359/30 |
| 5,058,124 A | 10/1991 | Cameron et al. | |
| 5,066,088 A | 11/1991 | Davies et al. | |
| 5,123,073 A | 6/1992 | Pimpinella | |
| 5,499,732 A | 3/1996 | Nishimoto | |
| 5,500,910 A | 3/1996 | Boudreau et al. | |
| 5,691,989 A * | 11/1997 | Rakuljic et al. ................ 372/20 |
| 5,692,083 A | 11/1997 | Bennett | |
| 5,710,672 A | 1/1998 | Roberts et al. | |
| 5,719,691 A | 2/1998 | Curtis et al. | |
| 5,886,971 A | 3/1999 | Feldman et al. | |
| 5,912,872 A | 6/1999 | Feldman et al. | |
| 5,932,045 A | 8/1999 | Campbell et al. | |
| 5,956,106 A | 9/1999 | Peterson et al. | |

(Continued)

FOREIGN PATENT DOCUMENTS

WO    WO 2005/059902 A3    6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Stephone B Allen
*Assistant Examiner*—Jennifer L. Doak
(74) *Attorney, Agent, or Firm*—Vedder Price P.C.; Ajay A. Jagtiani

(57) ABSTRACT

A holographic memory system is disclosed. The holographic memory system comprises: a light source configured to generate a light beam; a photosensitive holographic storage medium configured to at least partially reflect the light beam; and an alignment module configured to determine an angular orientation of the storage medium based on the reflected light beam.

66 Claims, 12 Drawing Sheets

U.S. PATENT DOCUMENTS

| | | | |
|---|---|---|---|
| 5,982,513 A * | 11/1999 | Zhou et al. | 359/22 |
| 6,047,008 A | 4/2000 | Funakawa | |
| 6,081,381 A | 6/2000 | Shalapenok et al. | |
| 6,103,454 A | 8/2000 | Dhar et al. | |
| 6,104,690 A | 8/2000 | Feldman et al. | |
| 6,137,601 A | 10/2000 | Khoury et al. | |
| 6,265,240 B1 | 7/2001 | Dautartas et al. | |
| 6,344,148 B1 | 2/2002 | Park et al. | |
| 6,389,045 B1 | 5/2002 | Mann et al. | |
| 6,414,763 B1 | 7/2002 | Hesselink et al. | |
| 6,449,627 B1 | 9/2002 | Baer et al. | |
| 6,482,551 B1 | 11/2002 | Dhar et al. | |
| 6,545,958 B1 * | 4/2003 | Hirai et al. | 369/44.32 |
| 6,614,566 B1 | 9/2003 | Curtis et al. | |
| 6,650,447 B2 | 11/2003 | Curtis et al. | |
| 6,743,552 B2 | 6/2004 | Setthachayanon et al. | |
| 6,747,257 B1 | 6/2004 | Farnsworth et al. | |
| 6,765,061 B2 | 7/2004 | Dhar et al. | |
| 6,768,426 B2 | 7/2004 | Nekado et al. | |
| 6,780,546 B2 | 8/2004 | Trentler et al. | |
| 6,796,697 B1 | 9/2004 | Bragg et al. | |
| 6,862,121 B2 | 3/2005 | Psaltis et al. | |
| 6,909,529 B2 | 6/2005 | Curtis | |
| 6,925,225 B2 | 8/2005 | Engel et al. | |
| 6,956,998 B2 | 10/2005 | Shahar et al. | |
| 6,992,805 B2 | 1/2006 | Ingwall et al. | |
| 7,027,197 B2 | 4/2006 | Newswanger et al. | |
| 7,092,133 B2 | 8/2006 | Anderson et al. | |
| 2003/0206320 A1 | 11/2003 | Cole et al. | |
| 2004/0027625 A1 | 2/2004 | Trentler et al. | |
| 2004/0027668 A1 | 2/2004 | Ayres | |
| 2004/0223330 A1 | 11/2004 | Broude et al. | |
| 2005/0013231 A1 | 1/2005 | Kawano et al. | |
| 2005/0041000 A1 | 2/2005 | Plut | |
| 2005/0141810 A1 | 6/2005 | Vaez-Iravani et al. | |
| 2005/0146762 A1 | 7/2005 | Hoogland et al. | |
| 2005/0190451 A1 | 9/2005 | Hansen | |
| 2005/0270855 A1 | 12/2005 | Earhart et al. | |
| 2005/0270856 A1 | 12/2005 | Earhart et al. | |
| 2005/0286388 A1 | 12/2005 | Ayres et al. | |
| 2006/0274393 A1 | 12/2006 | Fotheringham et al. | |
| 2006/0274394 A1 | 12/2006 | Riley et al. | |
| 2006/0275670 A1 | 12/2006 | Riley et al. | |
| 2006/0279818 A1 | 12/2006 | Ayres et al. | |
| 2006/0279819 A1 | 12/2006 | Krneta et al. | |
| 2006/0279820 A1 | 12/2006 | Riley et al. | |
| 2006/0279821 A1 | 12/2006 | Riley et al. | |
| 2006/0279822 A1 | 12/2006 | Krneta et al. | |
| 2006/0279823 A1 | 12/2006 | Riley et al. | |
| 2006/0279824 A1 | 12/2006 | Riley et al. | |
| 2006/0280096 A1 | 12/2006 | Riley et al. | |
| 2006/0281021 A1 | 12/2006 | Riley et al. | |
| 2006/0291022 A1 | 12/2006 | Redmond et al. | |
| 2006/0291023 A1 | 12/2006 | Riley et al. | |

OTHER PUBLICATIONS

Smothers, et al., "Photopolymers for Holography," *SPIE OE/Laser Conference*, (Los Angeles, Calif., 1990), pp. 1212-03.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A., et al., "Beam-Shaping Optics Expand Excimer Laser Applications," Laser Focus World (Jun. 2005).

McLeod, et al. "Micro-Holographic Multi-Layer Optical Disk Data Storage," *International Symposium on Optical Memory and Optical Data Storage* (Jul. 2005).

Shelby, "Media Requirements for Digital Holographic Data Storage," *Holographic Data Storage*, Section 1.3 (Coufal, Psaltis, Sincerbox Eds. 2003).

Fuertes, J.M., et al., "Absolute Type Shaft Encoding Using LFSR Sequences With Prescribed Length", IEEE Transactions on Instrumentation and Measurement, vol. 57, No. 5, (May 2008), pp. 915-922.

PCT/US2007/06094 International Search Report and the Written Opinion of the International Searching Authority, or the Declaration, mailed Aug. 22 2008.

PCT/US2006/19906 International Search Report and the Written Opinion of the International Searching Authority, or the Declaration, mailed Sep. 16, 2008.

* cited by examiner

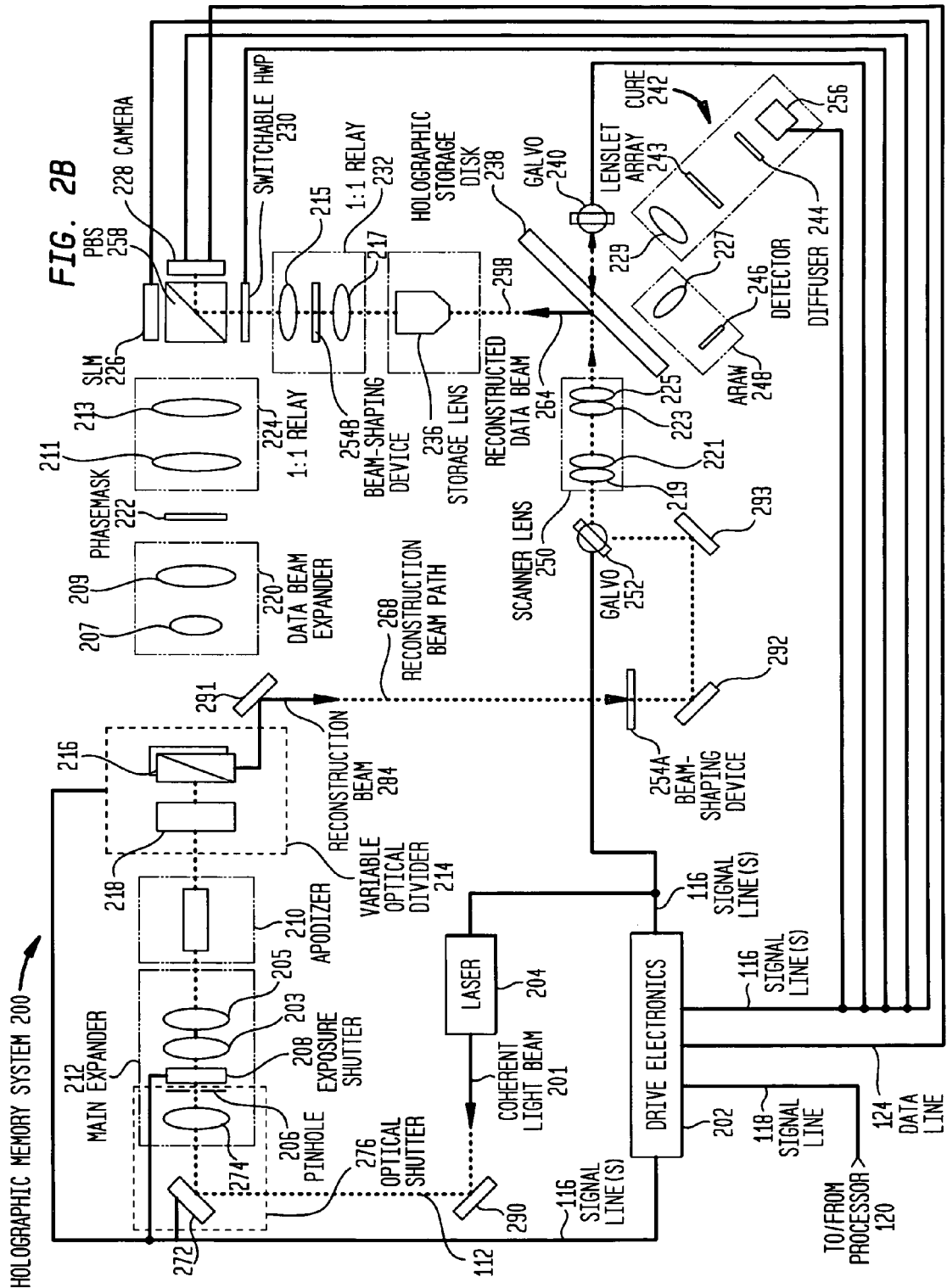

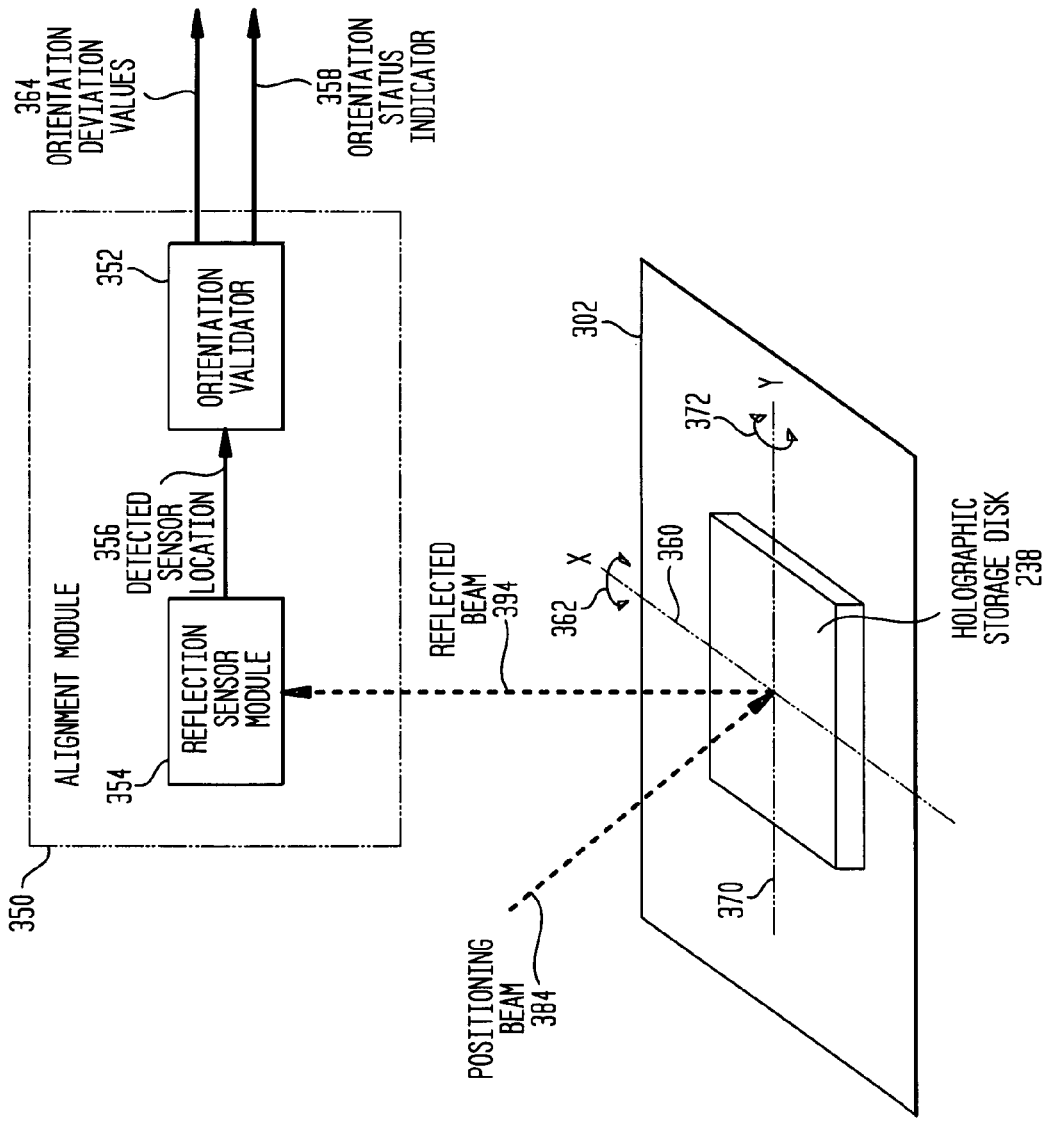

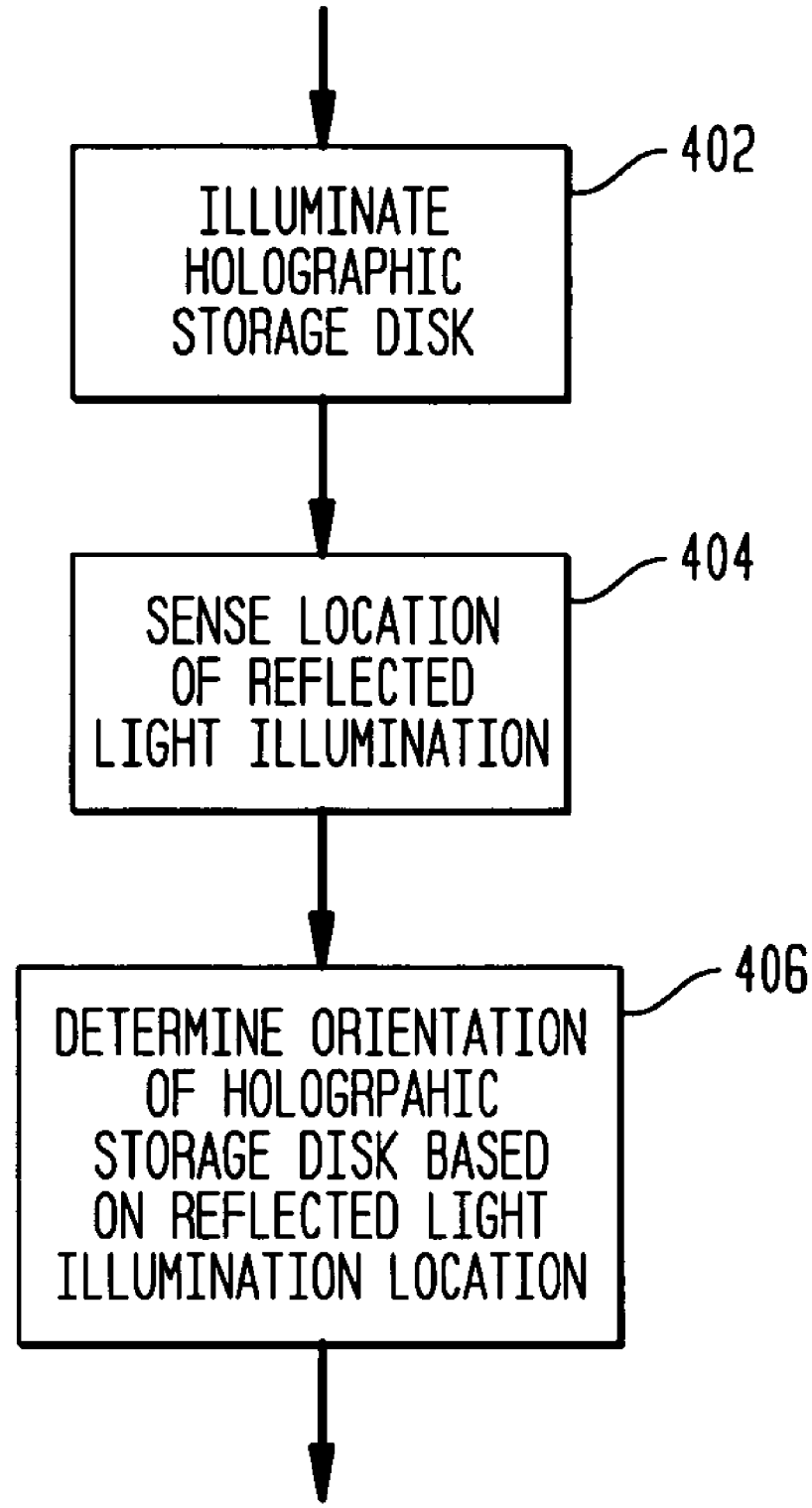

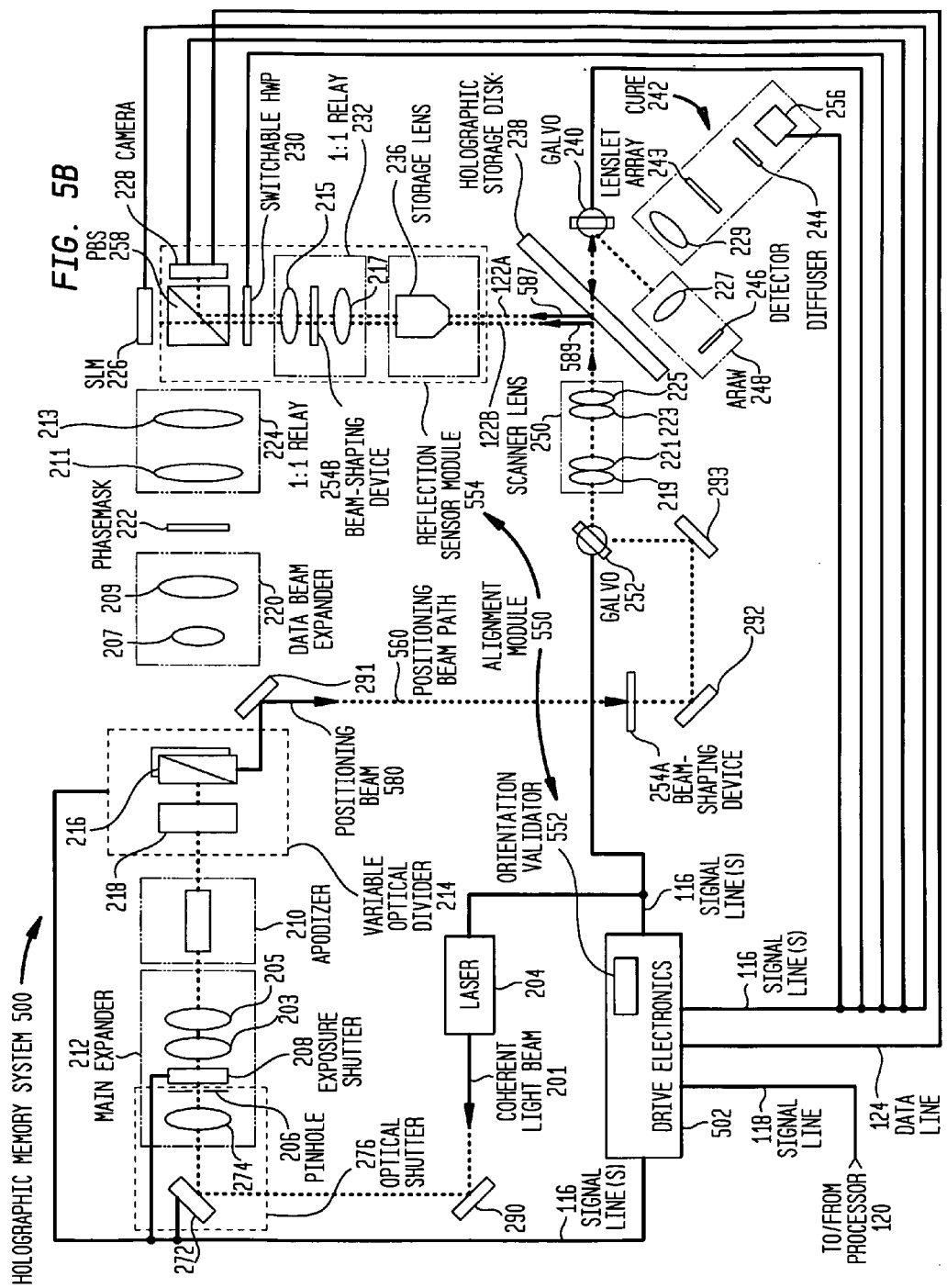

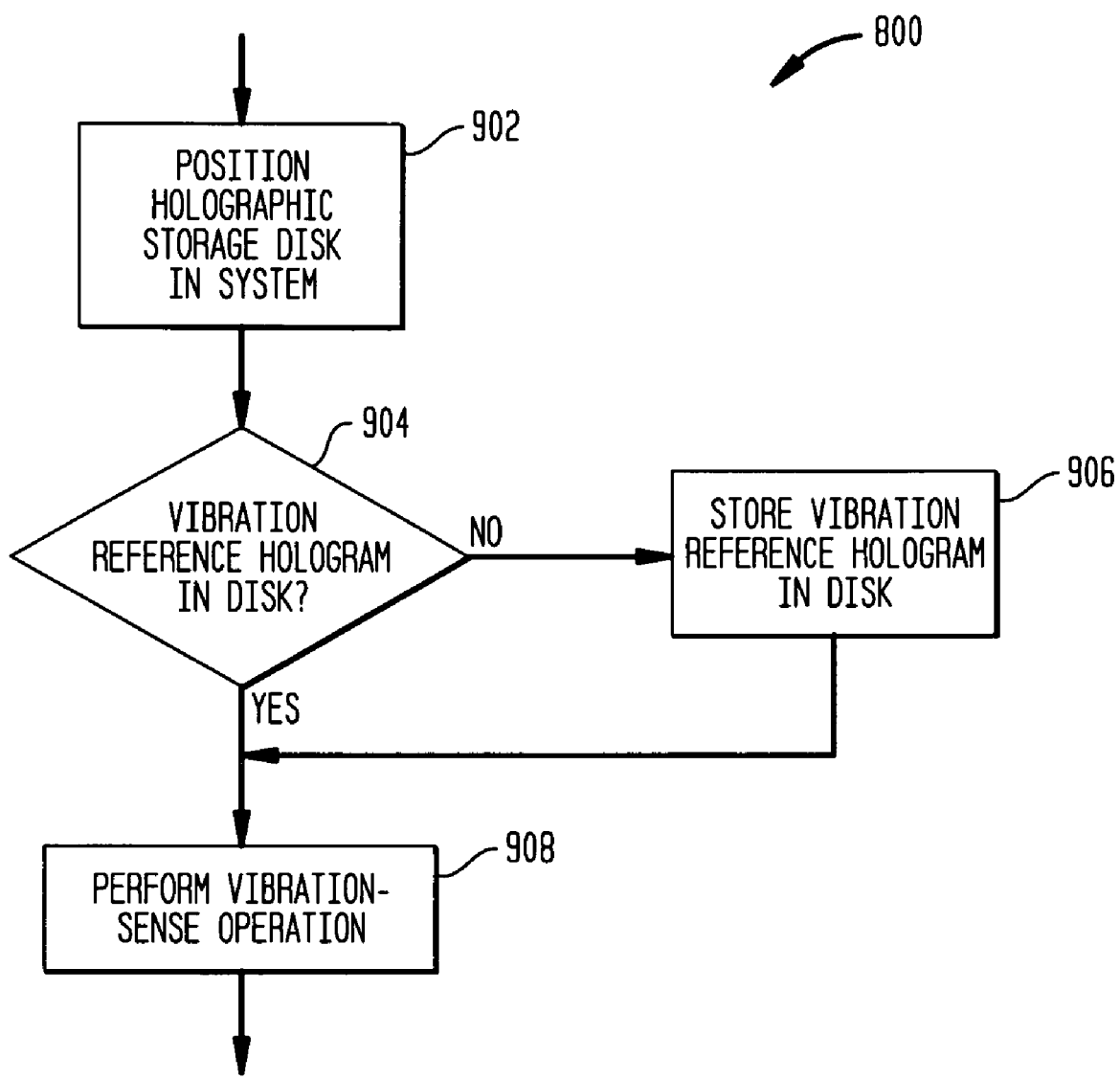

SENSING AND CORRECTING ANGULAR ORIENTATION OF HOLOGRAPHIC MEDIA IN A HOLOGRAPHIC MEMORY SYSTEM BY PARTIAL REFLECTION, THE SYSTEM INCLUDING A GALVANO MIRROR

CROSS-REFERENCE TO RELATED APPLICATIONS

This application makes reference to and claims the benefit of the following U.S. Provisional Patent Application No. 60/684,531 filed May 26, 2005. The entire disclosure and contents of the foregoing Provisional Application is hereby incorporated by reference. This application also makes reference to the following U.S. Patent Applications. The first application is U.S. application Ser. No. 11/440,370, entitled "Illuminative Treatment of Holographic Media," filed May 25, 2006. The second application is U.S. application Ser. No. 11/440,446, entitled "Methods and Systems for Laser Mode Stabilization," filed May 25, 2006. The third application is U.S. application Ser. No. 11/440,447, entitled "Phase Conjugate Reconstruction of Hologram," filed May 25, 2006. The fourth application is U.S. application Ser. No. 11/440,448, entitled "Improved Operational Mode Performance of a Holographic Memory System," filed May 25, 2006. The fifth application is U.S. application Ser. No. 11/440,359, entitled "Holographic Drive Head and Component Alignment," filed May 25, 2006. The sixth application is U.S. application Ser. No. 11/440,358, entitled "Optical Delay Line in Holographic Drive," filed May 25, 2006. The seventh application is U.S. application Ser. No. 11/440,357, entitled "Controlling the Transmission Amplitude Profile of a Coherent Light Beam in a Holographic Memory System," filed May 25, 2006. The eighth application is U.S. application Ser. No. 11/440,372, entitled "Sensing Absolute Position of an Encoded Object," filed May 25, 2006. The ninth application is U.S. application Ser. No. 11/440,367, entitled "Post-Curing of Holographic Media," filed May 25, 2006. The tenth application is U.S. application Ser. No. 11/440,366, entitled "Erasing Holographic Media," filed May 25, 2006. The eleventh application is U.S. application Ser. No. 11/440,365, entitled "Laser Mode Stabilization Using an Etalon," filed May 25, 2006. The twelfth application is U.S. application Ser. No. 11/440,369, entitled "Holographic Drive Head Alignments," filed May 25, 2006. The thirteenth application is U.S. application Ser. No. 11/440,368, entitled "Replacement and Alignment of Laser," filed May 25, 2006. The entire disclosure and contents of the foregoing U.S. Patent Applications are hereby incorporated by reference.

BACKGROUND

1. Field of the Invention

The present invention relates generally to holographic memory systems, and more particularly, to sensing angular orientation of a holographic medium in a holographic memory system.

2. Related Art

Developers of information storage devices continue to seek increased storage capacity. As part of this development, memory systems employing holographic optical techniques, referred to herein as holographic memory systems, have been suggested as alternatives to conventional memory devices.

Typically, holographic memory systems read/write data to/from a photosensitive storage medium. Such systems typically access holographic representations (i.e., holograms) substantially throughout the spatial extent of the storage medium. This allows holographic memory systems to advantageously store a large amount of data.

Holographic memory systems may be designed to record data as single bits of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation, (i.e., a page) of data.

Holographic memory systems typically involve the three-dimensional storage of holograms as a pattern of varying refractive index and/or absorption imprinted into the storage medium. In general, holographic memory systems operate to perform a data write (also referred to as a data record or data store operation, simply "write" operation herein) by combining two coherent light beams at a particular point within the storage medium. Specifically, a data-encoded light beam is combined with a reference light beam to create an interference pattern in the photosensitive storage medium. The interference pattern induces material alterations in the storage medium to form a hologram. The formation of the hologram is a function of the relative amplitudes, phase, coherence and polarization states of the data-encoded and reference light beams. It is also dependent on the relative wavelength of the incident beams as well as the three dimensional geometry at which the data-encoded and reference light beams are projected into the storage medium.

Holographically-stored data is retrieved from the holographic memory system by performing a read of the stored data (also referred to as a data reconstruction operation, simply "read" operation herein). The read operation is performed by projecting a reconstruction or probe beam into the storage medium at the same angle, wavelength, phase and position as the reference beam used to record the data, or compensated equivalents thereof. The hologram and the reconstruction beam interact to reconstruct the data beam. The reconstructed data beam is then detected by a sensor, such as a photodetector, sensor array, camera, etc. The reconstructed data is then processed for delivery to an output device.

As noted, illumination of a holographic medium with coherent light beams having precise incidence angles, wavelengths, phases, positions, etc., allows for accurate operation of the holographic memory system. Accordingly, it is desirable to ensure that the holographic memory system is properly aligned and free of error-causing defects to achieve correct illumination of the holographic medium.

SUMMARY

In one aspect of the invention, a holographic memory system is disclosed. The holographic memory system comprises: a light source configured to generate a light beam; a photosensitive holographic storage medium configured to at least partially reflect the light beam; and an alignment module configured to determine an angular orientation of the storage medium based on the reflected light beam.

In another aspect of the invention, an alignment module positioned in a holographic memory system having a photosensitive storage medium is disclosed. The alignment module comprises: a reflection sensor module configured to detect said reflected light beam, and to generate a signal representing a location of the reflected light beam on a sensor in said reflection sensor module.

In another aspect of the invention, a method of operating a holographic memory system having a photosensitive storage medium positioned is disclosed. The method comprises: generating a light beam; reflecting at least a portion of said light beam from said storage medium; and sensing an angular orientation of said storage medium based on said reflected light beam.

In another aspect of the invention, a method of operating a holographic memory system having a photosensitive storage medium stored therein is disclosed. The method comprises: illuminating said storage medium with one or more coherent light beams; sensing vibrations in said holographic memory system based on said illumination of said storage medium with said one or more coherent light beams.

BRIEF DESCRIPTION OF THE DRAWINGS

Embodiments of the present invention will be described in conjunction with the accompanying drawings, in which:

FIG. 2B is an architectural block diagram of the components of a holographic memory system illustrating the optical paths utilized during a read operational mode of the holographic memory system, in accordance with one embodiment of the present invention;

FIG. 3 is a schematic block diagram of the primary components of an alignment module as may be implemented in a holographic memory system such as that illustrated in FIGS. 1, 2A, and 2B;

FIG. 4 is a high-level flowchart of the operations performed during an alignment verification mode in a holographic memory system, in accordance with embodiments of the present invention;

FIG. 5B is an architectural block diagram of the components of a holographic memory system illustrating the optical paths utilized during an alignment verification mode in accordance with another embodiment of the present invention;

FIG. 9 is a high level flowchart of the operations performed during a vibration-sense mode in a holographic memory system in accordance with embodiments of the present invention.

DETAILED DESCRIPTION

Aspects of the present invention are generally directed to detecting potential alignment problems in a holographic memory system. Generally, aspects of the present invention are directed to sensing the angular orientation of a holographic medium with respect to other components of the holographic memory system to verify that the angular orientation of the medium is within operating tolerances for performing a desired operation in the system, such as reading and writing to/from the holographic medium. For example, proper relative orientation of the holographic medium ensures that during a write operation, data will be accurately recorded to a desired location, and that during a read operation, data will read from the correct location to accurately reconstruct desired information.

Specifically, a holographic memory system illuminates a holographic medium with a coherent light beam. The coherent light beam is reflected from the holographic medium towards an alignment module comprising a reflection sensor module and an orientation validator. The reflection sensor module detects the reflected light, and provides to the orientation validator the location of the reflected coherent light beam on a sensor in the reflection sensor module. The orientation validator determines the relative orientation of the holographic medium based on the location information provided by reflection sensor module, and further determines whether the orientation of the holographic medium is within operating tolerances for performance of the read, write and other operations in the holographic memory system.

In further embodiments of the present invention, the orientation validator provides the angular deviation of the holographic storage medium to the drive electronics which, in turn, adjust optical components within the system to compensate for the angular deviation of the holographic storage medium.

Further aspects of the present invention are directed to sensing vibrations in the holographic memory system. Specifically, in embodiments of the present invention, vibrations in the holographic memory system are sensed by observing an interference fringe pattern resulting from an illumination of the storage medium.

Figure 1:
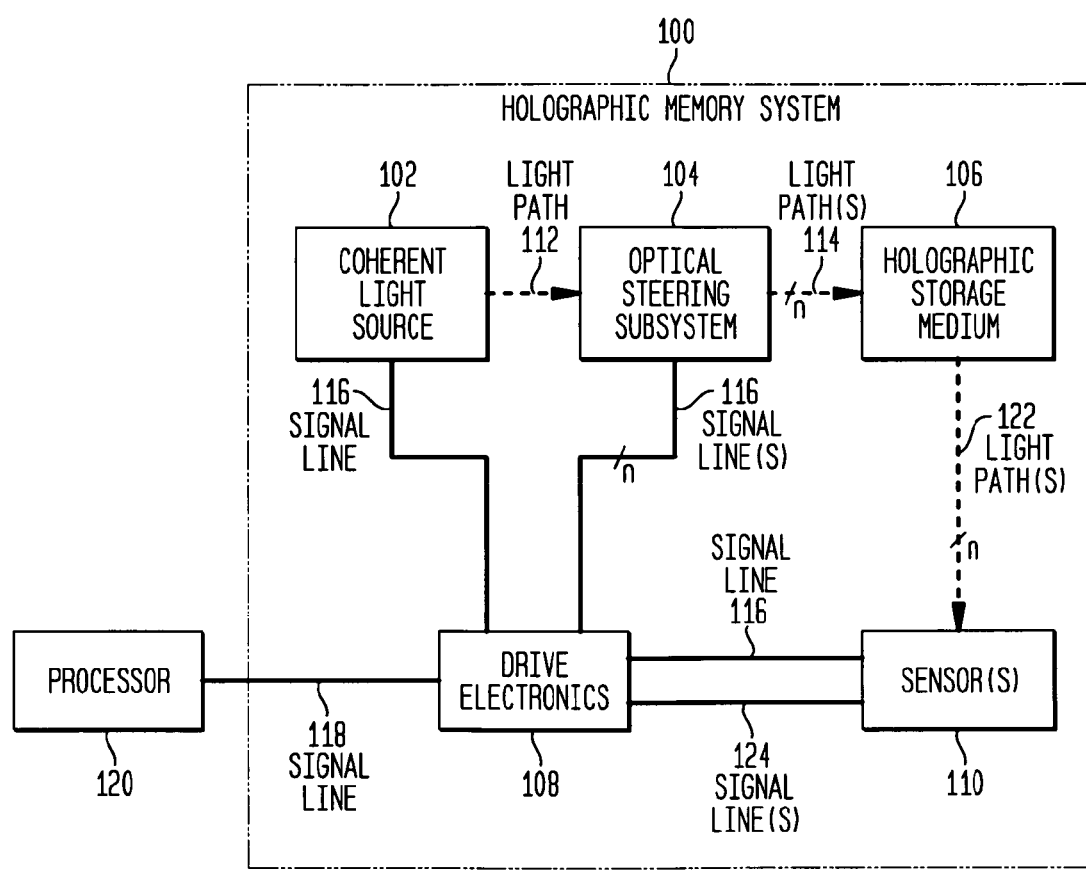
FIG. 1 is schematic block diagram of an exemplary holographic memory system in which embodiments of the present invention may be advantageously implemented.

As noted, embodiments of the present invention may be used in holographic memory systems; that is, data storage and retrieval systems that implement holographic optical techniques. FIG. 1 is a block diagram of an exemplary holographic memory system in which embodiments of the present invention may be advantageously implemented. It should be appreciated that although embodiments of the present invention will be described in the context of the exemplary holographic memory system shown in FIG. 1, the present invention may be implemented in connection with any system now or later developed that implement holographic optical techniques.

Holographic memory system 100 receives along signal line 118 signals transmitted by an external processor 120 to read and write date to a photosensitive holographic storage medium 106. As shown in FIG. 1, processor 120 communicates with drive electronics 108 of holographic memory system 100. Processor 120 transmits signals based on the desired mode of operation of holographic memory system 100. For ease of description, the present invention will be described with reference to read and write operational modes of a holographic memory system. It should be apparent to one of ordinary skill in the art, however, that the present invention applies to other operational modes of a holographic memory system, such as Pre-Cure, Post-Cure, Write Verify, or any other operational mode implemented now or in the future in a holographic memory system.

Using control and data information from processor 120, drive electronics 108 transmit signals along signal lines 116 to various components of holographic memory system 100. One such component that receives signals from drive electronics 108 is coherent light source 102. Coherent light source 102 may be any light source now or later developed that generates a coherent light beam. In one embodiment of the invention, coherent light source 102 is a laser.

The coherent light beam from coherent light source 102 is directed along light path 112 into an optical steering subsystem 104. Optical steering subsystem 104 directs one or more coherent light beams along one or more light paths 114 to holographic storage medium 106. In the write operational mode described further below, at least two coherent light beams are transmitted along two light paths 114 to create an interference pattern in holographic storage medium 106. The interference pattern induces material alterations in storage medium 106 to form a hologram, as described in further detail below.

In the read operational mode, holographically-stored data is retrieved from holographic storage medium 106 by projecting a reconstruction or probe beam along one light path. 114 into storage medium 106. The hologram and the reconstruction beam interact to reconstruct the data beam which is transmitted along light path 122. The reconstructed data beam is detected by a sensor 110. It would be apparent to one of ordinary skill in the art that sensor 110 could be any type of detector used in the art. In one embodiment, sensor 110 is a camera. In another embodiment, sensor 110 is a photodetector.

The light detected at sensor 110 is converted to a signal and transmitted to drive electronics 108 via signal line 124. Processor 120 then receives the requested data and/or related information from drive electronics 108 via signal line 118.

Figure 2A:
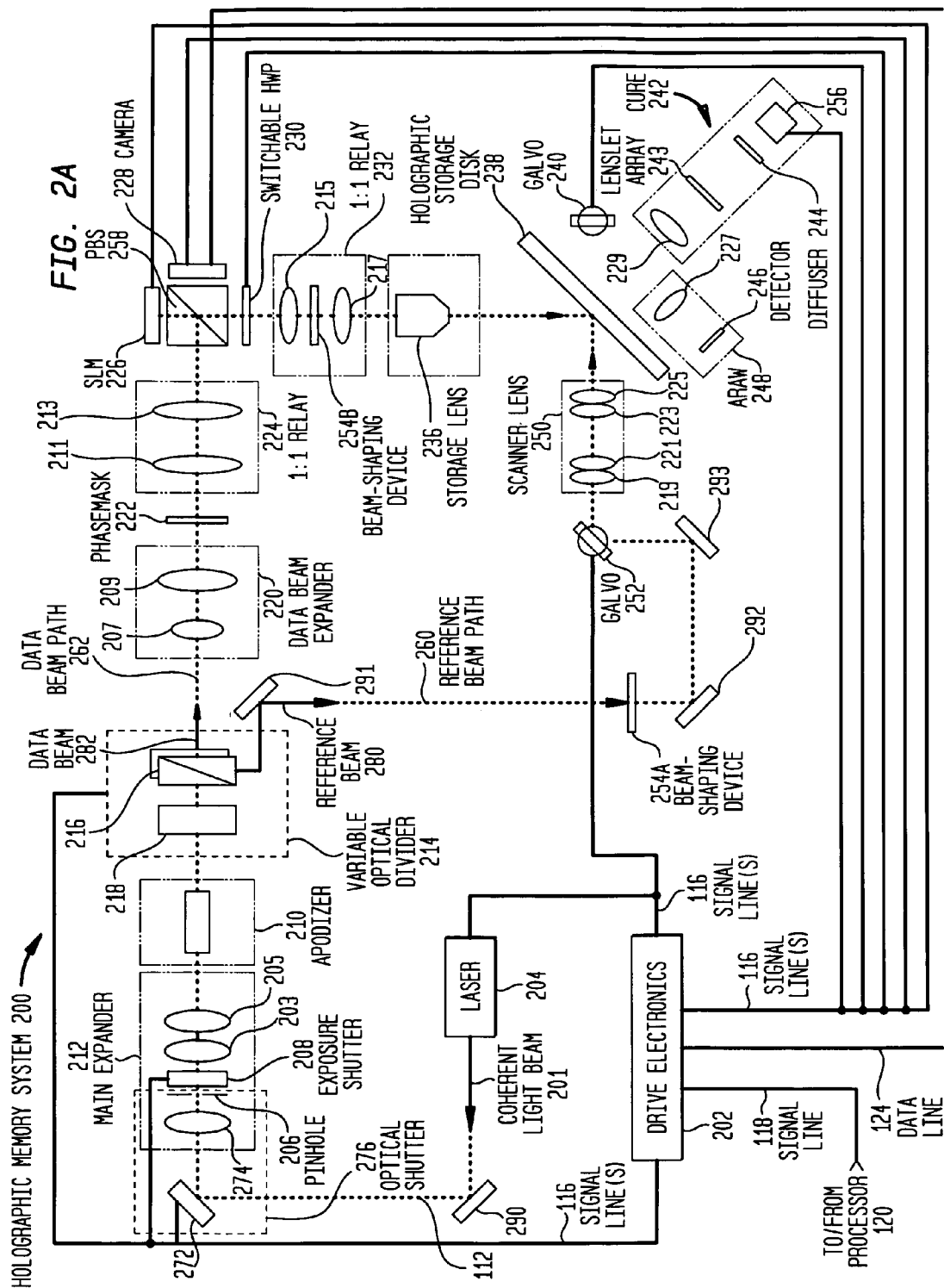
FIG. 2A is an architectural block diagram of the components of a holographic memory system illustrating the optical paths utilized during a write operational mode of the holographic memory system, in accordance with one embodiment of the present invention.

A more detailed description of the components of an exemplary embodiment of holographic memory system 100 is presented next below with reference to FIGS. 2A and 2B. This embodiment of holographic memory system 100 is referred to herein as holographic memory system 200. FIGS. 2A and 2B are similar schematic block diagrams of the components of one embodiment of holographic memory system 200 illustrating the optical paths utilized during write and read operational modes, respectively, of the holographic memory system.

Referring to the write operational mode configuration illustrated in FIG. 2A, coherent light source 102 (FIG. 1) is a laser 204. Laser 204 receives via signal line 116 (FIG. 1) control signals from an embodiment of drive electronics 108 (FIG. 1), referred to as drive electronics 202. In the illustrated write mode configuration, such a control signal causes laser 204 to generate a coherent light beam 201 which is directed along light path 112, introduced above with reference to FIG. 1.

Coherent light beam 201 from laser 204 is reflected by mirror 290 and is directed through optical shutter 276. Optical shutter 276 comprises beam deviation assembly 272, focusing lens 274 and pinhole 206 that are collectively operable to shutter coherent light beam 201 from entering the remainder of optical steering subsystem 104.

Coherent light beam 201 passing through optical shutter 276 enters main expander assembly 212. Main expander 212 includes lenses 203 and 205 to expand the light beam to a fixed diameter. Main expander 212 also includes lens 274 and pinhole 206 to spatially filter the light beam. An exposure shutter 208 within main expander assembly 212 is an electromechanical device that controls recording exposure times. As shown in FIG. 2A, the exemplary embodiment of optical shutter 276 utilizes components of main expander 212, namely, pinhole 206 and focusing lens 274.

Upon exiting main expander assembly 212, coherent light beam 201 is directed through an apodizer 210. As is well-known in the art, light emitted from a laser such as laser 204 generally has a spatially varying distribution of light. Apodizer 210 converts this spatially varying intensity beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among these discrete light beams 280, 282. In the write operational mode shown in FIG. 2A, the discrete light beam directed along light path 260 is the noted reference light beam, referred to herein as reference beam 280, while the discrete light beam directed along light path 262 is the noted data light beam, referred to as data beam 282.

Upon exiting variable optical divider 214, reference beam 280 is reflected by mirror 291 and directed through beam-shaping device 254A positioned in reference path 260. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage media 106, shown as holographic storage disk 238 in FIGS. 2A and 2B.

Returning attention to variable optical divider 214, data light beam 282 exits the variable optical divider and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 is then imaged to SLM 226 via 1:1 relay 224 having lenses 211 and 213, and PBS 258.

SLM 226 modulates data beam 282 to encode information into the data beam. SLM 226 receives the encoding information from drive electronics 202 via a signal line 116. Modulated data beam 282 is reflected from SLM 226 and passes through PBS 258 to a switchable half-wave plate 230. Switchable half-wave plate 230 is used to optionally rotate the polarization of data beam 282 by 90 degrees. A 1:1 relay 232 containing beam-shaping device 254B and lenses 215 and 217 directs data beam 282 to storage lens 236 which produces a filtered Fourier transform of the SLM data inside holographic storage disk 238.

At a particular point within holographic storage disk 238, reference beam 280 and data beam 282 create an interference pattern to record a hologram in holographic storage disk 238.

Holographic memory system 100 further comprises an illuminative curing subsystem 242. Illuminative curing subsystem 242 is configured to provide a uniform curing light beam with reduced coherence to holographic storage disk 238 to pre-cure and/or post-cure a region of the storage medium. Illuminative curing subsystem 242 comprises a laser 256 sequentially aligned with a diffuser 244, a lenslet array 243 and a lens 229. Laser 256 provides a high intensity illuminative curing light beam that is incident on storage disk 238. The light from laser 256 is processed by diffuser 244, lenslet array 243, and lens 229 prior to reaching holographic storage disk 238.

Holographic memory system 100 additionally comprises an associative read after write (ARAW) subsystem 248. ARAW subsystem 248 is configured to partially verify a hologram soon after the hologram is written to holographic storage disk 238. ARAW subsystem comprises a lens 227 and a detector 246. Holographic memory system 100 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Referring to the read mode configuration illustrated in FIG. 2B, laser 204 generates coherent light beam 201 in response to control signals received from drive electronics 202. As noted above, coherent light 201 is reflected by mirror 290 through optical shutter 276 that shutters coherent light beam 201 from entering the remainder of optical steering subsystem 104. Coherent light beam 201 thereafter enters main expander assembly 212. Main Expander includes lenses 203 and 205 to expand the light beam to a fixed diameter, and lens 274 and pinhole 206 which spatially filter the light beam, as described above with reference to FIG. 2A. Upon exiting main expander assembly 212, coherent light 201 is directed through apodizer 210 to convert the spatially varying intensity beam into a more uniform beam.

In the arrangement of FIG. 2B, when coherent light beam 201 enters variable optical divider 214, dynamically-controlled polarization device 218 and PBS 216 collectively redirect the coherent light beam into one discrete light beam 114, referred to as reconstruction beam 284. Reconstruction data beam 284 travels along reconstruction beam path 268, which is the same path 260 traveled by reference beam 280 during the write mode of operation, described above with reference to FIG. 2A.

A desired portion of the power of coherent light beam 201 is allocated to this single discrete light beam based on the selected polarization implemented in device 218. As will be described in detail below, in certain embodiments, all of the power of coherent light beam 201 is allocated to reconstruction light beam 284 to maximize the speed at which data may be read from holographic medium 238.

Upon exiting variable optical divider 214, reconstruction beam 284 is directed by mirror 291 through beam-shaping device 254A. As noted, beam-shaping device 254A is described further below.

After passing through beam-shaping device 254A, reconstruction beam 284 is directed to scanner lens 250 by mirrors 292 and 293, and galvo mirror 252. Scanner lens assembly 250 pivots reconstruction beam 284 at a desired angle toward holographic storage disk 238.

During the read mode, reconstruction beam 284 passes through holographic storage disk 238 and is retro-reflected back through the medium by a galvo mirror 240. As shown in FIG. 2B, the data reconstructed on this second pass through storage disk 238 is directed along reconstructed data beam path 298 as reconstructed data beam 264.

Reconstructed data beam 284 passes through storage lens 236 and 1:1 relay 232 to switchable half wave plate 230. Switchable half wave plate 230 is controlled by drive electronics 202 so as to have a negligible polarization effect. Reconstructed data beam 264 then travels through switchable half wave plate 230 to PBS 258, all of which are described above with reference to FIG. 2A. PBS 258 reflects reconstructed data beam 264 to an embodiment of sensor 110 (FIG. 1), here a camera 228. The light detected by camera 228 is converted to a signal and transmitted to drive electronics 202 via signal line 124, introduced above with reference to FIG. 1. Processor 120 then receives the requested data and/or related information from drive electronics 202 via signal line 118.

Specific embodiments of the present invention will now be described in more detail. FIG. 3 is a functional block diagram of the primary components of an alignment module 350 as may be implemented in a holographic memory system such as that illustrated in FIGS. 2A and 2B. As noted, to accurately perform certain operations of holographic memory system 200 (FIGS. 2A, 2B), the angular orientation of holographic storage disk 238 relative to other components of the holographic system are to be within operating tolerances required by the operation to be performed by the system.

For ease of illustration, an imaginary plane 302 is depicted in FIG. 3 to represent the ideal relative orientation of holographic storage disk 238. Holographic storage disk 238 rotates within plane 302 during normal operations of holographic memory system 200. Plane 302 has orthogonal X- and Y-axes 360 and 372. In certain situations, holographic storage disk 238 may rotate around X-axis 360 or Y-axis 370, as shown by arrows 362 and 372, respectively. This causes holographic storage disk 238 to rotate out of plane 302. The rotation of holographic storage disk 238 around X-axis 360 and/or Y-axis 370 may be sufficiently large to cause the relative orientation of the storage disk to be out of tolerance for holographic memory system 200 to accurately perform a particular operation.

Aspects of the present invention are generally directed to detecting the motion of holographic storage disk 238 around X-axis 360 or Y-axis 370 to sense potential alignment problems in holographic memory system 200.

In the embodiment illustrated in FIG. 3, holographic memory system 200 illuminates holographic storage disk 238 with a coherent light beam, referred to herein as positioning beam 384.

Positioning beam 384 is reflected from holographic storage disk 238 towards alignment module 350. This light beam is referred to as reflected beam 394. Alignment module 350 comprises a reflection sensor module 354 and an orientation validator 352. Reflection sensor module 354 detects reflected beam 394, and provides to orientation validator 352 the location 356 of reflected coherent light beam 394 on a sensor (not shown) in reflection sensor module 354.

Orientation validator 352 determines the relative orientation of holographic storage disk 238 based on the location information 356 provided by reflection sensor module 354. Orientation validator 352 further determines if holographic storage disk 238 is within operating tolerances for performance of read, write and/or other operations in holographic memory system 200. As shown in FIG. 3, orientation validator 352 generates output signals indicating the results of the above operations. Specifically, orientation validator 352 generates an orientation status indicator 358 indicating whether the orientation of holographic storage disk 238 is within the operating tolerances set for a future operation of holographic memory system 200. Preferably orientation validator 352 further generates orientation deviation values 364 indicating the relative angular deviation of holographic storage disk 238; that is, the angular deviation around the X- and Y-axes 360, 370 of plane 302. Holographic memory system 200 may then use orientation status indicator 358 and orientation deviation values 364 to determine whether to proceed with the future operation and, if so, whether to first adjust components of optical steering subsystem 104 to compensate for any deviations in the relative orientation of holographic storage disk 238 and other components of holographic memory system 200.

FIG. 4 is a high level flowchart of the operations performed during an alignment verification mode in a holographic memory system in accordance with the embodiments of the present invention. In embodiments of holographic memory system 200 illustrated in FIG. 4, at block 402 holographic memory system 200 illuminates a holographic storage disk with a positioning light beam. At block 404, holographic memory system 200 senses the location of a light beam reflected from holographic storage disk. At block 406, holographic memory system determines the orientation of the holographic storage disk based on the location of the light reflected from the holographic storage disk.

Figure 5A:
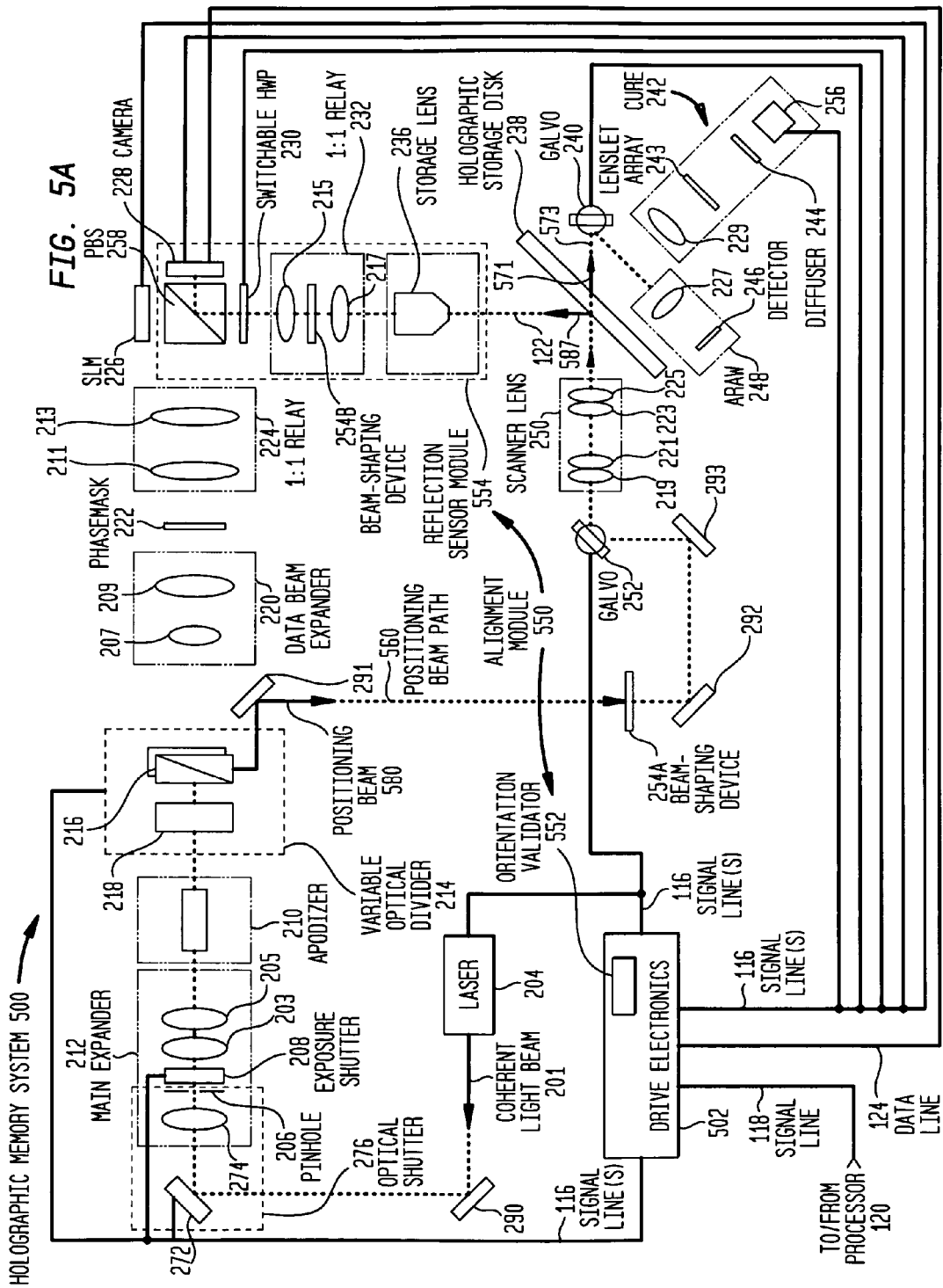
FIG. 5A is an architectural block diagram of the components of a holographic memory system illustrating the optical paths utilized during an alignment verification mode in accordance with one embodiment of the present invention.

FIGS. 5A and 5B are architectural block diagrams of the components of a holographic memory system illustrating the optical paths utilized during an alignment verification mode in accordance with embodiments of the present invention. In the embodiments illustrated in FIGS. 5A and 5B, holographic memory system 100 is referred to herein as holographic memory system 500.

In the illustrative alignment verification mode, an alignment module 350 (FIG. 3) is configured to determine the angular orientation of holographic storage disk 238 with respect to the other components of holographic memory system 500. In the embodiment illustrated in FIGS. 5A and 5B, alignment module 350 is referred to as alignment module 550. Alignment module 550 comprises a reflection sensor module 554 and an orientation validator 552.

Holographic memory system 500 is configured to provide a coherent light beam 201 to optical steering subsystem 104 (FIG. 1). Optical steering subsystem is configured to direct this coherent light beam to holographic storage disk 238. The reflection of this light incident on holographic storage disk 238 is directed to alignment module 550.

In the embodiments illustrated in FIGS. 5A and 5B, alignment module 550 determines the orientation of holographic storage disk 238 based on the coherent light from coherent light source 102 (FIG. 1) that is reflected from holographic storage disk 238. As noted with reference to the examples illustrated in FIGS. 2A and 2B, coherent light source 102 is a laser 204. Laser 204 is the same light source used by holographic memory system 500 during the write and read operational modes described above with reference to FIGS. 2A and 2B.

Laser 204 receives via signal line 116 control signals from an embodiment of drive electronics 108 (FIG. 1), referred to herein as drive electronics 502. In the illustrated alignment verification mode, such a control signal causes laser 204 to generate coherent light beam 201 which is directed along light path 112, introduced above with reference to FIGS. 1, 2A and 2B.

As noted above, coherent light beam 201 is directed through optical shutter 276 by mirror 290. Optical shutter 276 is controllable to shutter coherent light beam 201 from entering the remainder of optical steering subsystem 104, and main expander assembly 212 which spatially filters and controls the exposure times of the light beam. Upon exiting main expander assembly 212, coherent light beam 201 is directed through an apodizer 210 to provide a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. In the embodiments shown in FIGS. 5A and 5B, variable optical divider 214 directs a portion of coherent light beam 201 along positioning beam path 560. This light beam is referred to herein as positioning beam 580. In one embodiment, variable optical divider 214 is configured to direct approximately all of coherent light beam 201 into positioning beam 580. In other embodiments, variable optical divider 214 is configured to direct a substantially lesser portion of coherent light beam 201 into positioning beam 580. In embodiments of the present invention, variable optical divider 214 is configured to block light from exiting the optical divider in undesired directions.

Upon exiting variable optical divider 214, positioning beam 580 is directed through beam-shaping device 254A via mirror 291. After passing through beam-shaping device 254A, positioning beam 580 is directed to scanner lens 250 by mirrors 292 and 293, and galvo mirrors 252. Scanner lens assembly 250 directs positioning beam 580 at a desired angle toward holographic storage disk 238.

In the embodiments shown in FIGS. 5A and 5B, positioning beam 580 exiting scanner lens assembly 250 is incident on holographic storage disk 238, and is substantially transmitted through the storage disk. As a result, only a small portion of incident positioning beam 580 is reflected from holographic storage disk 238. In one embodiment, holographic storage disk 238 is configured to reflect approximately 4% of an incident coherent light beam. In accordance with other embodiments, holographic storage disk 238 is coated to reduce the amount of light reflected from the storage disk. The use of an anti-reflection coating on holographic storage disk 238 allows a lesser amount of light to be reflected by the storage disk than is capable with an uncoated storage medium. The light reflected from a coated holographic storage disk 238 is known as a small intensity reflection. In embodiments of the present invention, holographic storage disk 238 having an anti-reflective coating would reflect approximately 0.5 to 1% of positioning beam 580 incident on holographic storage disk.

In the embodiments shown in FIGS. 5A and 5B, the small intensity reflection from holographic storage disk 238 is a collimated coherent light beam, referred to herein as light beam 587. In these embodiments, light beam 587 is directed towards reflection sensor module 554.

Reflection sensor module 554 comprises a lens subsystem 236, a 1:1 relay 232, a switchable half wave plate 230, a polarizing beam splitter (PBS) 258 and a sensor array 110 (FIG. 1). In the embodiments shown in FIGS. 5A and 5B, sensor array 110 is a camera 228 and lens subsystem 236 comprises storage lens 236. Storage lens 236, 1:1 relay 232, switchable half wave plate 230, and PBS 258 are sequentially aligned between holographic storage disk 238 and camera 228.

As shown in FIGS. 5A and 5B, light beam 587 enters reflection sensor module 554 and is focused by storage lens 236. Camera 228 is positioned at the focal plane of storage lens 236 as relayed by 1:1 relay 232. As a result, storage lens 236 focuses light beam 587 into a focused point in the same plane as camera 228.

In embodiments of reflection sensor module 554, light beam 587 leaving storage lens 236 is directed towards camera 228 via 1:1 relay 232. Switchable half wave plate 230 and PBS 258 are positioned between 1:1 relay 232 and camera 228 to direct light beam 587 in a desired direction depending on the polarization state of light beam 587. PBS 258 is configured to direct light beam 587, or any other incident light beam, in a particular direction based on the polarization of the incident light beam.

In certain embodiments, positioning beam 580 is a vertically-polarized coherent light beam. In these embodiments, light beam 587 resulting from the small intensity reflection is also a vertically-polarized light beam. As a result, switchable half wave plate 230 does not rotate the polarization of light beam 587 and PBS 258 reflects light beam 587 towards camera 228.

In other embodiments, positioning beam 580 is a horizontally-polarized coherent light beam. In these embodiments, light beam 587 resulting from the small intensity reflection is also a horizontally-polarized light. As a result, switchable half wave plate 230 is configured to rotate the polarization of light beam 587 by 90 degrees, thereby converting coherent light beam 587 into a vertically-polarized light beam. PBS 258 then directs vertically polarized coherent light beam 587 towards camera 228.

Fundamental optical aspects underlying reflection sensor module 554 are discussed below. It is a principle of optics that a lens will focus an incident light beam to a particular point at the focal plane of the lens. The position of the focal point depends on the angle of the light incident on the lens. Therefore, a lens will focus a light beam having a particular incident angle to a consistent particular point at the focal plane.

It is also a principle of optics that a lens will transform an angle into a displacement. In other words, a shift in the incident angle of light into a lens results in a corresponding translation of the focal point of light leaving the lens. Specifically, the translation of the focal point is related to the angular shift of the incident light beam by the F-Theta rule. The F-Theta rule is an approximation stating that translation of the focal point in any one direction is equal to the focal length of the lens multiplied by the angular shift of the incident light beam. Similarly, this approximation may be affected by lens distortions or aberrations.

As noted above, scanning lens 250 is configured to direct positioning beam 580 towards holographic storage disk 238 at a desired angle. When holographic storage disk 238 is lying in imaginary plane 302 as described above with reference to FIG. 3, light beam 587 will be reflected to storage lens 236 at a corresponding additional desired angle. As a result, storage lens 236 will focus light beam 587 to a corresponding desired point on camera 228. This desired point is referred to herein as the proper alignment point.

In accordance with the above principles of optics, a shift in the orientation of holographic storage disk 238 about X-axis 360 or Y-axis 370 of plane 302, i.e., rotates out of plane 302, causes a corresponding shift in the angle of light beam 587 from holographic storage disk 238. This shift in the angle of light beam 587 will cause storage lens 236 to focus light beam at point that is translated some distance from the proper alignment point in accordance with the F-Theta rule.

In the embodiments shown in FIGS. 5A and 5B, camera 228 detects the location of the focused point of light beam 587. The translation of the focused point of light beam 587 away from the proper alignment point is converted to a signal and is transmitted to orientation validator 552 via signal line 124. Orientation validator 552 is configured to convert the translation of the focused point of light beam 587 away from the proper alignment point into an angular deviation of holographic storage disk 238 about X-axis 360 or Y-axis 370. Orientation validator 252 thereby determines if holographic storage disk 238 is in a correct angular orientation to allow holographic memory system 600 to accurately perform read, write or other operations.

If orientation validator 552 determines the holographic storage disk 238 is in an incorrect orientation, orientation validator 552 is configured to adjust the orientation of holographic storage disk 238 to proper alignment. Orientation validator 552 is configured to adjust for an incorrect orientation of holographic storage disk 238 through the motion of galvo mirror 252 and galvo mirror 240.

As described above, when positioning beam 580 is incident on holographic storage disk 238, a substantial portion of positioning beam 580 is transmitted through holographic storage disk 238 and is incident on galvo mirror 240. In the embodiments of the present invention illustrated in FIGS. 5A and 5B, in order for alignment module 550 to correctly determine the orientation of holographic storage disk 238, holographic memory system 500 is configured to prevent the portion of positioning beam 580 transmitted through holographic storage disk 238 from reaching camera 228. The embodiments illustrated in FIGS. 5A and 5B show different approaches to prevent the transmitted portions of positioning beam 580 from reaching camera 228.

In the embodiments of the present invention, a hologram is read from holographic storage disk 238 using double pass phase conjugation, as shown in FIG. 2B. As a result, when a light beam is incident on holographic storage disk 238 from scanner lens 250, the light beam passes through holographic storage disk 238 and is reflected back through holographic storage disk 238 via galvo mirror 240. In the read mode, during this second pass through, a hologram is read from holographic storage disk 238 and is reflected to camera 228, as described above with reference to FIG. 2B.

Referring first to FIG. 5A, in response to a signal from drive electronics 202 indicating that an alignment verification operation is to occur, galvo mirror 240 adjusts the angle at which it reflects an incident light beam. In this embodiment, the portion of positioning beam 580 transmitted through holographic storage disk 238 is referred to as transmitted beam 571 along light path 573. Transmitted beam 571 is incident on galvo mirror 240 and is directed away from holographic storage disk 238. In the embodiment of the present invention illustrated in FIG. 5A, galvo mirror 240 is configured to direct transmitted beam 571 in a direction such that transmitted beam 571 will not reach camera 228.

Referring to FIG. 5B, holographic memory system 100 is configured such that positioning beam 580 leaving variable optical divider 214 is a horizontally polarized coherent light beam. As a result, when positioning beam 580 is incident on holographic storage disk 238, the resulting small intensity reflection as light beam 587 is also a horizontally polarized light. Light beam 587 is directed along optical path 122A (FIG. 1). As described above, storage lens 236 focuses light beam 587 to camera 228.

In this embodiment, the portion of positioning beam 280 transmitted through holographic storage disk 238 is incident on galvo mirror 240. Galvo mirror 240 is configured to direct this portion of positioning beam back through holographic storage disk 238. This light emerges from holographic storage disk 238 as a coherent light beam 589 directed along optical path 122B (FIG. 1). In embodiments of the present invention, light beam 589 is a reconstructed data beam. Optical paths 122A and 122B are the same or substantially the same light paths extending from holographic storage disk 238 to PBS 258.

In the embodiment illustrated in FIG. 5B, coherent light beam 589 is incident on storage lens 236. Both coherent light beam 589 and light beam 587 leaving storage lens 236 are directed through 1:1 relay 232 to switchable half wave plate 230. As noted, the polarization of coherent light beam 589 is rotated 90 degrees from the polarization of light beam 587. This polarization rotation is caused by the passing of coherent light beam 589 through holographic storage disk 238. Thus, coherent light beam 589 is a vertically polarized coherent light beam.

Switchable half wave plate 230 is configured to rotate the polarization of both light beam 587 and coherent light beam 589 by 90 degrees. As a result of this shift in the polarization of light beam 587 and coherent light beam 589, when these two light beams are incident on PBS 258 prior to camera 228, each beam is directed in a different direction. Vertically polarized light beam 587 is directed substantially towards camera 228 while horizontally polarized coherent light beam 589 substantially passes through PBS 258 towards SLM 226. It should be appreciated that because coherent light beam 589 is directed away from camera 228, camera 228 can more clearly measure the location of the focal point of light beam 587.

It would be appreciated that holographic memory system 500 operates in the alignment verification mode under various circumstances. In one embodiment, holographic memory system 500 is configured to determine the orientation of holographic storage disk 238 at least once per insertion of holographic storage disk 238 into holographic memory system. In further embodiments, holographic memory system 500 may operate to determine the orientation of holographic storage disk 238 more than once per insertion of holographic storage disk 238. For example, in certain embodiments, the frequent determination of the orientation of holographic storage disk 238 may be useful for holographic memory systems that suffer frequent problems resulting in the misalignment of the storage medium. In still further embodiments, holographic memory system 500 operates in the alignment verification mode to determine the angular orientation of holographic storage disk 238 before writing to (FIG. 2A), or reading from (FIG. 2B) to/from the storage disk.

In further embodiments of the present invention, holographic memory system 500 operates in the alignment verification mode during testing or calibration of the system. In accordance with this embodiment of the present invention, alignment optics may be inserted in place of holographic storage disk 238 to determine the correct orientation for holographic storage disk 238.

Furthermore, although lens subsystem 236 was illustrated as a single lens, it would be appreciated by one of ordinary skill in the art that lens subsystem could be a plurality of lenses configured to focus an incident light beam. In addition to the embodiments illustrated in FIGS. 5A and 5B, it would be appreciated by one of ordinary skill in the art that various other methods may be used in holographic memory system 500 to prevent unwanted beams from reaching camera 228. It would be appreciated by one of ordinary skill in the art that the embodiments illustrated in FIGS. 5A and 5B are merely exemplary and do not in any way restrict the invention. Specifically, it would be appreciated that the holographic memory system 500 could be configured to operate with an illumination source having any type of polarization, and is not limited to embodiments of horizontally or vertically polarized light.

Figure 6:
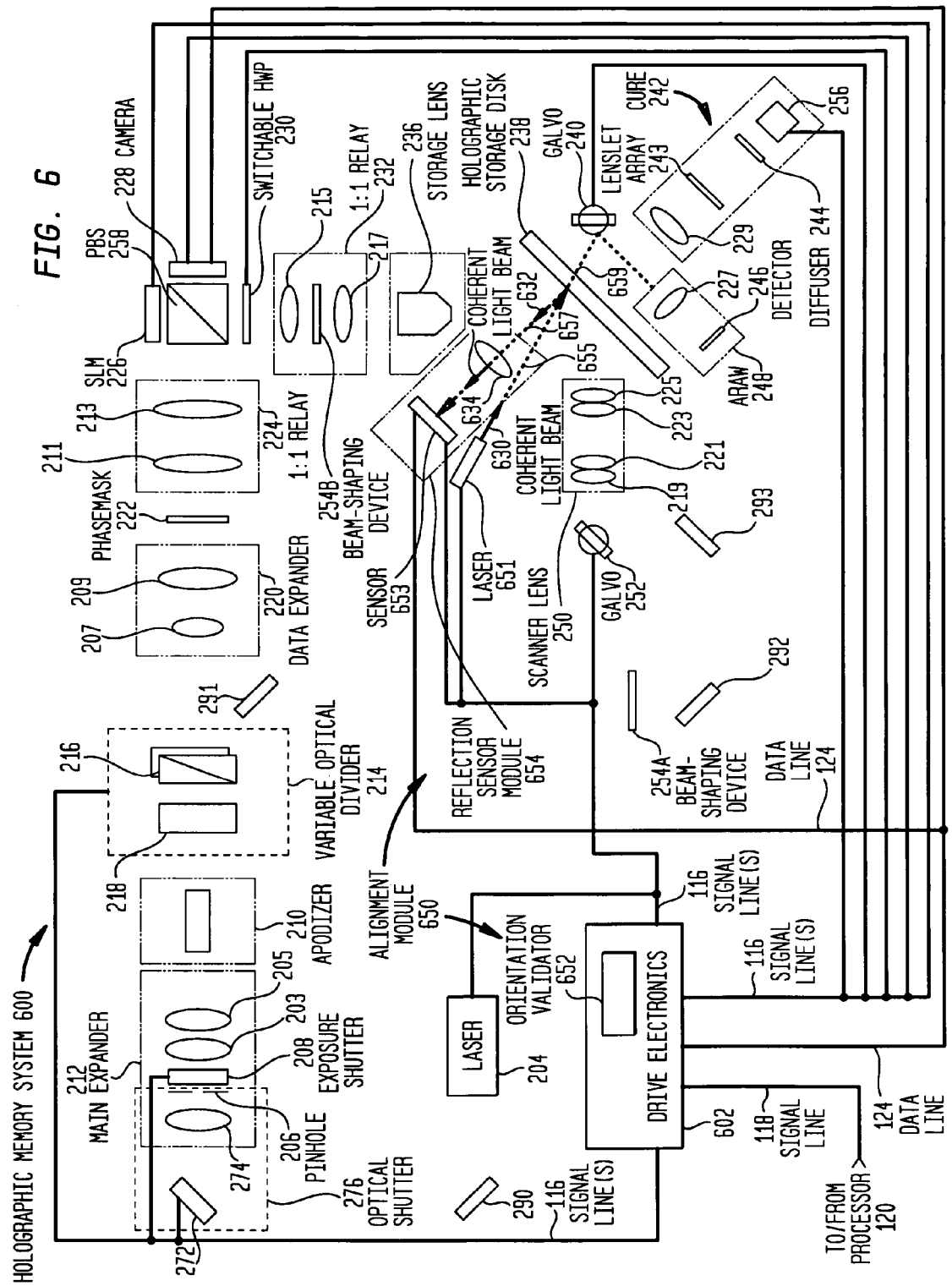
FIG. 6 is an architectural block diagram of the components of a holographic memory system illustrating the optical paths utilized during an alignment verification mode in accordance with further embodiments of the present invention.
Figure 7:
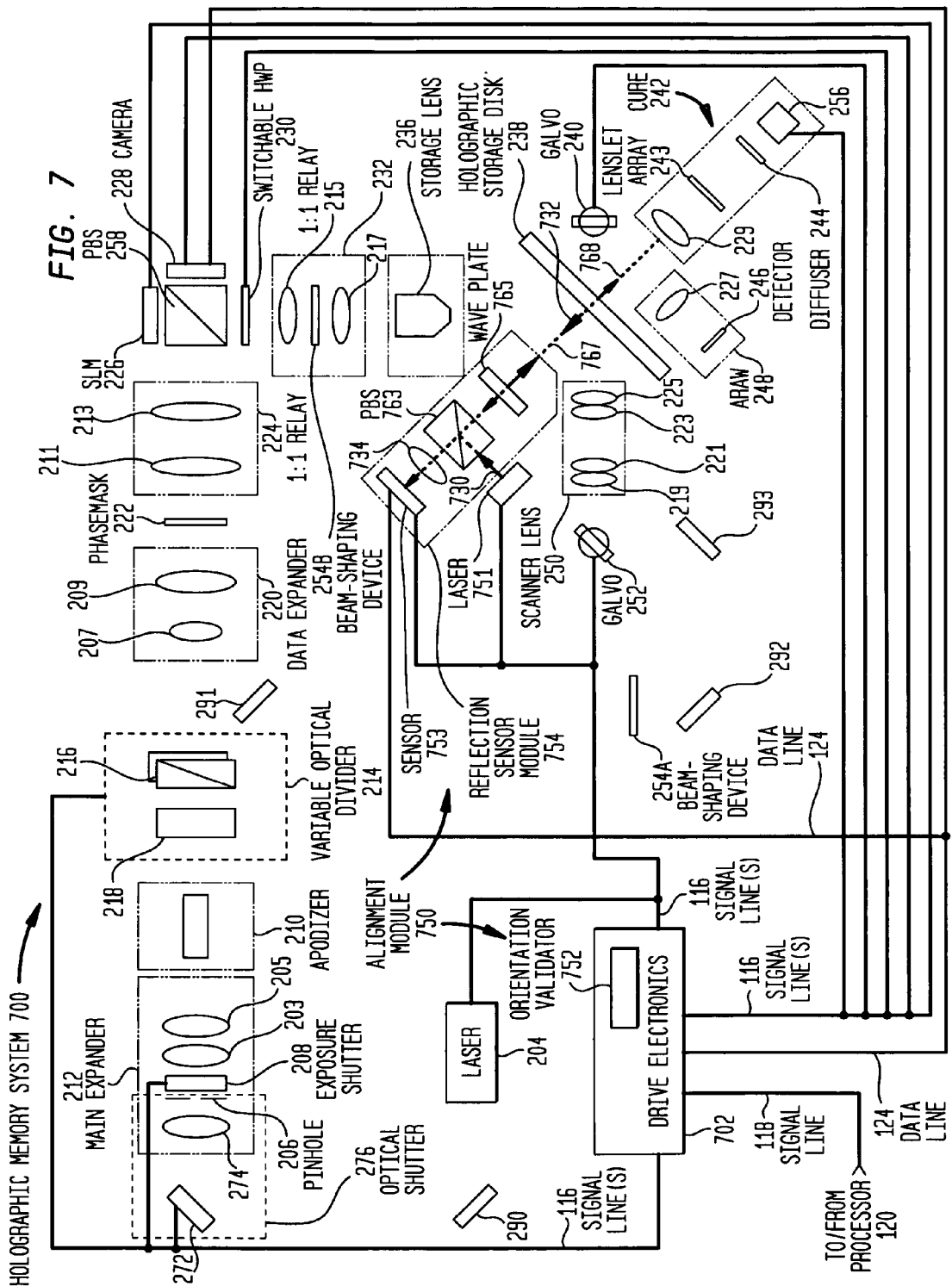
FIG. 7 is an architectural block diagram of the components of a holographic memory system illustrating the optical paths utilized during an alignment verification mode in accordance with other embodiments of the present invention.

FIGS. 6 and 7 are architectural block diagrams of the components of a holographic memory system illustrating the optical paths utilized during an alignment verification mode in accordance with further embodiments of the present invention. Referring first to FIG. 6, holographic memory system 200 is referred to herein as holographic memory system 600. In accordance with embodiments of holographic memory system 600, in alignment verification mode of the present invention, an alignment module 350 (FIG. 3) is configured to determine the angular orientation of holographic storage disk 238. In the embodiment illustrated in FIG. 6, alignment module 350 is referred to as alignment module 650. Alignment module 650 comprises a reflection sensor module 654, a laser 651 and an orientation validator 652.

A coherent light source 651 such as a laser generates a coherent light beam 630 which is directed to holographic storage disk 238. Laser 651 is a different light source that is used during the write and read operational modes described above with reference to FIGS. 2A and 2B. The reflection of this light incident on holographic storage disk 238 is directed to alignment module 650.

In the embodiments illustrated in FIG. 6, alignment module 650 determines the angular orientation of holographic storage disk 238 relative to optical steering subsystem 104 (FIG. 1) based on the coherent light from coherent light source 651 that is reflected from holographic storage disk 238. In the embodiments illustrated in FIG. 6, laser 651 receives via signal line 116 control signals from an embodiment of drive electronics 108 (FIG. 1), referred to herein as drive electronics 602. In the illustrated alignment verification mode, such a control signal causes laser 651 to generate coherent light beam 630 which is directed along light path 655, and is incident on holographic storage disk 238 at a desired angle.

As discussed above, holographic storage disk 238 is configured to transmit a substantial portion of coherent light beam 630 and thereby reflects only a small portion of coherent light beam 630. In accordance with preferred embodiments of holographic memory system 600, holographic storage disk 238 is coated to only reflect the small intensity reflection as described above with reference to FIGS. 5A and 5B.

In embodiments of the present invention, this small intensity reflection from holographic storage disk 238 is a collimated coherent light beam, referred to herein as light beam 632. In these embodiments, light beam 632 is directed towards reflection sensor module 654.

As shown in FIG. 6, light beam 632 enters reflection sensor module 654. Reflection sensor module 654 comprises a lens 634 positioned between holographic storage disk 238 and a sensor 653. Sensor 653 is positioned at the focal plane of lens 634. As a result, lens 634 focuses light beam 632 into a focused point in the same plane as sensor 653. In embodiments of the present invention, sensor 653 could be a camera, quad cell array, position sensing detector, or any type of detector known or used in the art.

As noted above with reference to FIGS. 5A and 5B, reflection sensor module 654 functions on several fundamental optical principles. Briefly, a lens will focus an incident light beam having a particular incident angle to a consistent particular point on the focal plane of the lens. Similarly, it is a principle of optics that a lens will transform a shift in the incident angle of light entering the lens into a translation of the focal point of light leaving the lens.

As noted above, in the embodiment illustrated in FIG. 6, laser 651 is configured to direct light beam 630 towards holographic storage disk 238 at a desired angle. When holographic storage disk 238 is lying in imaginary plane 302 as described above with reference to FIG. 3, light beam 632 will be reflected to lens 634 at a corresponding additional desired angle. As a result, lens 634 will focus light beam 632 to a corresponding desired point on sensor 653. This desired point is referred to herein as the proper alignment point.

In accordance with the above principles of optics, a shift in the orientation of holographic storage disk 238 about X-axis 360 or Y-axis 370 of plane 302, i.e., rotates out of plane 302, causes a corresponding shift in the angle of light beam 632 from holographic storage disk 238. This shift in the angle of light beam 632 will cause lens 634 to focus light beam at point that is translated some distance from the proper alignment point in accordance with the F-Theta rule.

In the embodiments shown in FIG. 6, sensor 653 detects the location of the focused point of light beam 632. The translation of the focused point of light beam 632 away from the proper alignment point is converted to a signal and is transmitted to orientation validator 652 via signal line 124. Orientation validator 652 is configured to convert the translation of the focused point of light beam 632 away from the proper alignment point into an angular deviation of holographic storage disk 238 about X-axis 360 or Y-axis 370. Orientation validator 652 thereby determines if holographic storage disk 238 is in a correct orientation to allow holographic memory system 600 to accurately perform read, write or other operations.

If orientation validator 652 determines the holographic storage disk 238 is in an incorrect orientation, orientation validator 652 is configured to adjust the orientation of holographic storage disk 238 to proper alignment. Orientation validator 652 is configured to adjust for an incorrect orientation of holographic storage disk 238 through the motion of galvo mirror 252 and galvo mirror 240.

It would be appreciated by one of ordinary skill in the art that holographic memory system 600 is configured to sense the orientation of holographic storage disk 238 using light sources other than a coherent light source. For example, in embodiments of the present invention holographic memory system is configured to operate with a non-coherent light source such as an LED.

Referring next to FIG. 7, holographic memory system 200 is referred to herein as holographic memory system 700. In accordance with embodiments of holographic memory system 700, in alignment verification mode of the present invention, an alignment module 350 (FIG. 3) is configured to determine the orientation of holographic storage disk 238. In the embodiment illustrated in FIG. 6, alignment module 350 is referred to as alignment module 750. Alignment module 750 comprises a reflection sensor module 754 and an orientation validator 752.

Holographic memory system 700 is configured to provide and direct a coherent light beam to holographic storage disk 238. The reflection of this light incident in holographic storage disk 238 is directed to alignment module 750. In the embodiments illustrated in FIG. 7, alignment module 750 determines the orientation of holographic storage disk 238 based on the coherent light from a coherent light source that is reflected from holographic storage disk 238. In embodiments of the present invention, the coherent light source configured to provide illumination to holographic storage disk 238 is laser 751. In embodiments of the present invention, laser 751 is a different laser than is used by holographic memory system 700 to perform read, write and other operations.

In the embodiments illustrated in FIG. 7, laser 751 receives via signal line 116 control signals from an embodiment of drive electronics 108 (FIG. 1), referred to herein as drive electronics 702. In the illustrated alignment verification mode, such a control signal causes laser 751 to generate coherent light beam 730.

In embodiments of the present invention, laser 751 directs coherent light beam 730 towards a PBS 763. PBS 763 is configured to direct an incident coherent light beam in a desired direction based on the polarization of the incident coherent light beam. In the embodiment shown in FIG. 7, PBS 763 is configured to substantially direct coherent light beam 730 towards holographic storage disk 238 along optical path 767.

Positioned between PBS 763 and holographic storage disk 239 in optical path 767 is a wave plate 765. Wave plate 765 is configured to rotate the polarization of an incident coherent light beam. In embodiments of the present invention, wave plate 765 is a quarter wave plate configured to rotate the polarization of an incident coherent light beam by a quarter wavelength or 45 degrees.

In the embodiment shown in FIG. 7, coherent light beam 730 reflected by PBS 763 passes through quarter wave plate 765. As a result, the linear polarization of coherent light beam 730 is converted into circular polarization. This light beam 730 having circular polarization is then incident on holographic storage disk 238 at a desired angle As discussed above, holographic storage disk 238 is configured to transmit a substantial portion of coherent light beam 730 and thereby reflects only a small portion of coherent light beam 730. In accordance with embodiments of holographic memory system 700, holographic storage disk 238 is coated to only reflect the small intensity reflection as described above with reference to FIGS. 5A and 5B. Holographic memory system 700 is configured so that the portion of coherent light beam 730 transmitted by holographic storage disk 238 is directed away from reflection sensor module 754.

In embodiments of the present invention, this small intensity reflection from holographic storage disk 238 is a coherent light beam, referred to herein as light beam 732. In these embodiments, light beam 732 is directed towards reflection sensor module 754. In the embodiment illustrated in FIG. 7, laser 751 and PBS 763 are positioned such that the small intensity reflection from holographic storage disk 238 is reflected back along optical path 767. Furthermore, the handedness of the circular polarization of light beam 732 is reversed upon reflecting off holographic storage disk 238.

As shown in FIG. 7, light beam 732 enters reflection sensor module 754. Reflection sensor module 754 comprises a quarter wave plate 765, a PBS 763, a lens 734, and a sensor 753 positioned at the focal plane of lens 734. Quarter wave plate 765, PBS 763, and lens 734 are sequentially aligned between holographic disk 238 and sensor 763.

Upon entering reflection sensor module 754, light beam 732 is incident on quarter wave plate 765. As noted, quarter wave plate 765 converts the polarization of light beam 732 from circular polarization into linear polarization. Because the handedness of circular polarization of light beam 732 is the reverse of coherent light beam 730, light beam 732 leaving quarter wave plate 765 is linearly polarized light which is rotated 90 degrees from coherent light beam 730 emanating from laser 751.

As would be appreciated by one of ordinary skill in the art, because PBS 763 is configured to substantially reflect light beam 730, PBS 763 will substantially transmit light beams having polarization orientations rotated 90 degrees from coherent light beam 730. As a result, PBS 763 substantially transmits light beam 732.

Light beam 732 transmitted by PBS 763 is then incident on lens 734. Because sensor 753 is positioned at the focal plane of lens 734, lens 734 focuses light beam 732 into a focused point in the same plane as sensor 753. In embodiments of the present invention, sensor 753 could be a camera, quad cell array, position sensing detector, or any type of detector known or used in the art.

As noted above with reference to FIGS. 5A and 5B, reflection sensor module 754 functions on several fundamental optical principles. Briefly, a lens will focus an incident light beam having a particular incident angle to a consistent particular point on the focal plane of the lens. Similarly, it is a principle of optics that a lens will transform a shift in the incident angle of light entering the lens into a translation of the focal point of light leaving the lens.

As noted above, in the embodiment illustrated in FIG. 7, laser 751 is configured to direct light beam 730 towards holographic storage disk 238 at a desired angle. When holographic storage disk 238 is lying in imaginary plane 302 as described above with reference to FIG. 3, light beam 732 will be reflected to lens 634 at a corresponding additional desired angle. As a result, lens 734 will focus light beam 732 to a corresponding desired point on sensor 753. This desired point is referred to herein as the proper alignment point.

In accordance with the above principles of optics, a shift in the orientation of holographic storage disk 238 about X-axis 360 or Y-axis 370 of plane 302, i.e., rotates out of plane 302, causes a corresponding shift in the angle of light beam 732 from holographic storage disk 238. This shift in the angle of light beam 732 will cause lens 734 to focus light beam at point that is translated some distance from the proper alignment point in accordance with the F-Theta rule.

In the embodiments shown in FIG. 7, sensor 753 detects the location of the focused point of light beam 632. The translation of the focused point of light beam 732 away from the proper alignment point is converted to a signal and is transmitted to orientation validator 752 via signal line 124. Orientation validator 752 is configured to convert the translation of the focused point of light beam 732 away from the proper alignment point into an angular deviation of holographic storage disk 238 about X-axis 360 or Y-axis 370. Orientation validator 652 thereby determines if holographic storage disk 238 is in a correct orientation to allow holographic memory system 600 to accurately perform read, write or other operations.

If orientation validator 752 determines the holographic storage disk 238 is in an incorrect orientation, orientation validator 752 is configured to adjust the orientation of holographic storage disk 238 to proper alignment. Orientation validator 752 is configured to adjust for an incorrect orientation of holographic storage disk 238 through the motion of galvo mirror 252 and galvo mirror 240.

It would be appreciated by one of ordinary skill in the art that holographic memory system 700 is configured to sense the orientation of holographic storage disk 238 using light sources other than a coherent light source. For example, in embodiments of the present invention holographic memory system is configured to operate with a non-coherent light source such as an LED.

It would be appreciated that in the embodiments illustrated in FIGS. 6 and 7, laser 651 may be shuttered or turned off after determining the orientation of holographic storage disk 238.

In another aspect of the present invention, holographic memory system 100 is configured to operate in a vibration-sensing operational mode. During a vibration-sensing mode, holographic memory system 100 operates to determine if the holographic memory system is currently experiencing vibrations that would adversely affect the integrity of the holographic memory system.

In one embodiment, holographic memory system 100 measures vibrations in the holographic memory system through the use of a detector module. The detector module is constructed and arranged to observe an interference fringe pattern resulting from the interference of two light beams. In embodiments of the present invention, detector module observes the interference pattern resulting from the interference of a light beam generated by a coherent light source, and a light beam generated by the illumination of a light source upon a holographic storage medium.

Figure 8A:
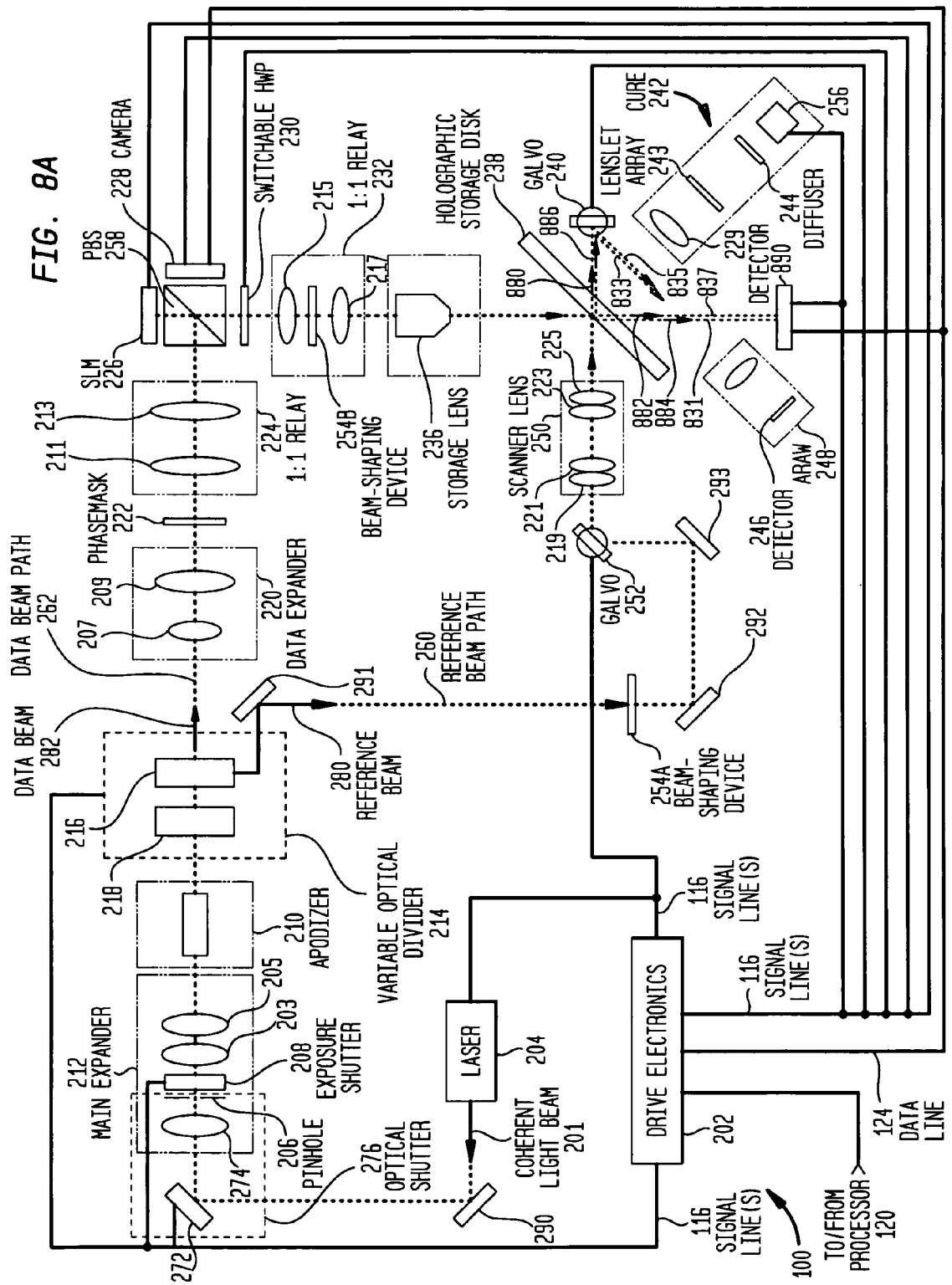
FIG. 8A is an architectural block diagram of the components of a holographic memory system illustrating the optical paths utilized during vibration-sensing operations in accordance with one embodiment of the present invention.
Figure 8B:
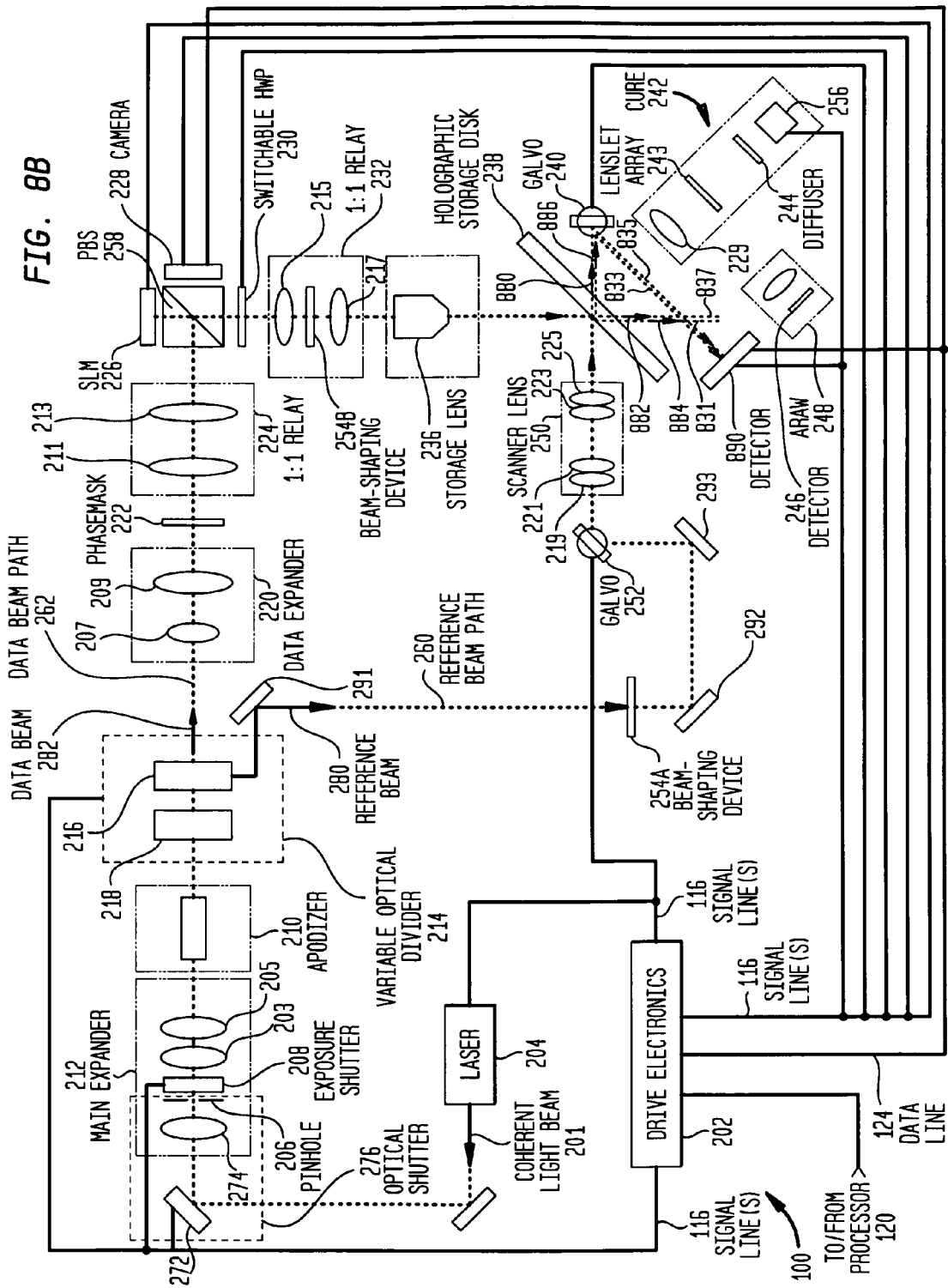
FIG. 8B is an architectural block diagram of the components of a holographic memory system illustrating the optical paths utilized during vibration-sensing operations in accordance with one embodiment of the present invention.

FIGS. 8A and 8B are architectural block diagrams of the components of a holographic memory system 800 illustrating the optical paths utilized during a vibration-sensing operation in accordance with embodiments of the present invention. In these exemplary embodiments, holographic memory system 800 uses a detector module 890 to sense vibrations in the holographic memory system.

FIG. 9 is a high level flowchart of the operations performed during a vibration-sense mode in a holographic memory system in accordance with embodiments of the present invention. Prior to performing the vibration-sensing operation, at block 902 a holographic storage disk 238 is positioned in holographic memory system 800.

At block 904, holographic memory system 800 is configured to verify that holographic storage disk 238 has a vibration reference hologram stored therein. The vibration reference hologram is a holographic data page stored in a desired position in holographic storage disk 238. In certain embodiments, vibration reference hologram is a high signal data page. A high signal data page is a data page that, upon reconstruction of the page, results in a reconstructed light beam having a power approximately equal to the power of the beam used to write the hologram. In preferred embodiments of the present invention, vibration reference hologram is an all white data page.

If holographic memory system 800 determines a vibration reference hologram is stored in holographic storage disk 238, the holographic memory system advances to perform the vibration-sense operation. If holographic memory system 800 determines holographic storage disk 238 does not have a vibration reference hologram stored therein, the holographic memory system moves to block 906.

At block 906, holographic memory system 800 stores a vibration reference hologram in holographic storage disk 238, as described above with reference to FIG. 2A.

In embodiments of the present invention, holographic memory system 800 verifies that holographic storage disk 238 has a vibration reference hologram stored therein prior to performing the vibration sensing operation each time the operation is performed, as shown in FIG. 9. In other embodiments of the present invention, holographic memory system 800 verifies that holographic storage disk 238 has a vibration reference hologram stored therein once per insertion of holographic storage disk 238 into holographic memory system 100.

During vibration-sensing operations, holographic memory system 800 simultaneously illuminates the vibration reference hologram stored in holographic storage disk 238 with two coherent light beams. The coherent light beams are the same or substantially the same coherent light beams that were used to write the vibration reference hologram into holographic storage disk 238.

In the embodiments of the present invention illustrated in FIGS. 8A and 8B, holographic storage disk 238 is illuminated with coherent light from a single coherent light source 102 (FIG. 1). In accordance with this embodiment, coherent light source 102 (FIG. 1) is a laser 204. Laser 204 receives via signal line 116 control signals from an embodiment of drive electronics 108 (FIG. 1), referred to as drive electronics 202. In the illustrated vibration sense mode configurations, such a control signal causes laser 204 to generate a coherent light beam 201 which is directed along light path 112, introduced above with reference to FIG. 1.

Coherent light beam 201 from laser 204 is reflected by mirror 290 and is directed through optical shutter 276. Optical shutter 276 is controllable to shutter coherent light beam 201 from entering the remainder of optical steering subsystem 104.

Coherent light beam 201 passing through optical shutter 276 enters main expander assembly 212. Main expander 212 spatially filters the light beam. An exposure shutter 208 within main expander assembly 212 controls recording exposure times.

Upon exiting main expander assembly 212, coherent light beam 201 is directed through an apodizer 210. Apodizer 210 converts spatially varying intensity beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among discrete light beams, reference beam 280 and data beam 282, introduced above with reference to FIG. 2A.

Upon exiting variable optical divider 214, reference beam 280 is imaged to beam-shaping device 254A via mirror 291. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 to holographic storage disk 238.

Returning attention to variable optical divider 214, data light beam 282 exits the variable optical divider and passes through data beam expander lens assembly 220. Data beam expander 220 magnifies data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 illumination of phasemask 222 is then imaged onto SLM 226 via 1:1 relay 224 having lenses 211 and 213. PBS 258 directs data beam 282 onto SLM 226.

SLM 226 modulates data beam 282 to encode information into the data beam. SLM 226 receives the encoding information from drive electronics 202 via a signal line 116. In accordance with the embodiments illustrated in FIGS. 8A and 8B, SLM encodes data beam 282 with the same page as was used to record vibration reference hologram.

Modulated data beam 282 is reflected from SLM 226 and passes through PBS 258 and switchable half wave plate and is imaged by 1:1 relay 232 to storage lens 236. Storage lens 236 produces a filtered Fourier transform of the SLM data at vibration reference hologram.

As a result, during the vibration-sensing operation mode, vibration reference hologram is illuminated with encoded data beam 282 that is the same or substantially the same as the data beam used to record vibration reference hologram in holographic storage disk 238. Simultaneously, vibration reference hologram is illuminated with reference beam 280 that is the same or substantially the same as the reference beam used to store vibration reference hologram in holographic storage disk 238.

Holographic storage disk 238 is configured to substantially pass through incident light beams. As a result, when holographic storage disk 238 is illuminated with data beam 282 and reference beam 280, each beam will substantially pass through holographic storage disk 238.

Generally, in holographic memory systems, when a recorded hologram is illuminated with one of the same or substantially the same beams as was used to record the hologram, the second beam used to record the hologram will be reconstructed. For example, by illuminating a hologram with the data beam used to write the hologram to a storage medium, the reference beam used to write the hologram to the medium will be reconstructed. Similarly, by illuminating a hologram with the reference beam used to write the hologram into the medium, the data beam used to write the hologram to the medium will be reconstructed. FIGS. 8A and 8B illustrate the use of the above phenomenon to measure vibrations in holographic memory system 800.

FIG. 8A illustrates the preferred configuration of holographic memory system 800 in the vibration sensing operational mode. As noted, in this embodiment, holographic memory system 800 is configured to illuminate vibration reference hologram with the same or substantially the equivalents of data beam 282 and reference beam 280 as were used to write vibration reference hologram into holographic storage disk 238.

In accordance with the holographic principles recited above, data beam 282 substantially passes through holographic storage disk 238 as data beam 882 along optical path 837. Similarly, the illumination of vibration reference hologram by reference beam 280 produces a reconstructed data beam 884 directed along optical path 831.

Vibration detector module 890 is positioned in optical paths 837 and 831. Vibration detector module 890 comprises a detector 890. Detector 890 observes the fringe pattern resulting from the interference of data beam 882 and reconstructed data beam 884.

Detector 890 measures the motion of the interference fringes across the detector. Vibration or motion in the components of holographic memory system 800 causes the pattern of interference fringes between reconstructed data beam 884 and data beam 882 to change shape and/or translate across detector 890. Thus, motion of the fringes indicates that there is vibration in holographic memory system 800. This motion is converted to a signal and is transmitted to drive electronics 202 via signal line 124.

FIG. 8B illustrates another configuration of holographic memory system 800 in the vibration sensing operational mode. As noted, in this embodiment, holographic memory system 800 is configured to illuminate vibration reference hologram with the same or substantially the equivalents of data beam 282 and reference beam 280 as were used to write vibration reference hologram into holographic storage disk 238.

In accordance with the holographic principles recited above, reference beam 280 substantially passes through holographic storage disk 238 as reference beam 880 along optical path 835. Similarly, the illumination of vibration reference hologram by data beam 282 produces a reconstructed reference beam 886 directed along optical path 833.

Vibration detector module 890 is positioned in optical paths 833 and 835. Vibration detector module 890 comprises a detector 890. Detector 890 observes the fringe pattern resulting from the interference of reference beam 880 and reconstructed reference beam 886.

Detector 890 measures the motion of the interference fringes across the detector. Vibration or motion in the components of holographic memory system 800 causes the interference fringes between reconstructed reference beam 886 and data beam 880 to translate across detector 890. Thus, motion of the fringes indicates that there is vibration in holographic memory system 800. This motion is converted to a signal and is transmitted to drive electronics 202 via signal line 124.

In accordance with embodiments of the present invention, holographic memory system 800 is configured such that the interfering beams are substantially parallel at detector 890. However, at detector 890, the interfering beams are configured to have a relatively small angular deviation between the two beams. In preferred embodiments of the present invention, the angular deviation between the interfering beams is tunable to a desired deviation so as to obtain a desired period or frequency for the interference fringes.

In embodiments of the invention, it is preferable to create a reconstructed beam having approximately the same power as the portion of the incident light beam that passes through holographic storage disk 238 to achieve visible interference fringes at detector 880. The interference between beams of approximately the same power result in interference fringes with highly visible bright areas and nearly dark areas between the bright areas. High visibility interference fringes improve the measurement of motion by detector 890.

As noted, a reconstructed beam of approximately the same power as a beam passing through holographic storage disk 238 is achieved by writing a high intensity data page into holographic storage disk 238 for use as vibration reference hologram. As noted above, in preferred embodiments of the present invention, this high intensity data is an all white page. However, the present invention would also work with a typical data page that is not all white.

In the embodiments of the present invention, the size of detector 890 is selected to obtain a desired output. Specifically, the size of detector 890 is chosen such that only a portion of a single fringe is incident on detector 539 at a particular time. If multiple interference fringes are visible on detector 890 at a particular time, the detector will merely take the average of what is visible. In other words, if multiple fringes are visible on detector 890 at a particular time, detector 890 may have a difficult time determining whether or not the fringes are moving across the detector.

In certain embodiments of the invention, the output of the detector 890 does not allow for active isolation or adjustment of vibration problems in holographic memory system 800. Detector 890 examines the sum of all of the vibrations in holographic memory system 800 and does not alone indicate the source of the vibration, how it is vibrating, or how much it is vibrating. However, in embodiments of the present invention, holographic memory system 800 may use various additional means to determine the source of the vibration.

In embodiments of the present invention, the vibration sensing operational mode of holographic memory system 800 is used to detect vibrations in the drive before reading from or writing to the drive. In this embodiment, if the vibration exceeds a certain amount, holographic memory system 800 may be configured to cease reading to or writing from holographic storage disk 238 until the vibrations are reduced or eliminated.

In certain embodiments of the present invention, holographic memory system 800 does not comprise detector 890.

In these particular embodiments, detector 890 is positioned outside holographic memory system 800. This configuration is used during the development, diagnosing and manufacturing of holographic memory system 800 for qualification testing.

In accordance with aspects of the present invention, detector 890 may be any type of detector configured to examine the motion of the interference fringes described above. In certain embodiments, detector 890 is a photodetector.

In other embodiments of the present invention, detector 890 is a camera, CCD or other imaging device. Such a detector would not be useful in certain embodiments because these types of detectors are not well suited for the detection of the motion of the interference fringes. However, such a detector may be useful in certain situations to observe the actual interference fringe pattern.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom. The present embodiments are, therefore, to be considered in all respects as illustrative and not restrictive.

All documents, patents, journal articles and other materials cited in the present application are hereby incorporated by reference.

What is claimed is:

1. A holographic memory system comprising:
    a light source to generate a light beam;
    a second light source to generate a non-coherent light beam;
    a photosensitive holographic storage medium having an anti-reflective coating configured to partially reflect said non-coherent light beam incident on said photosensitive holographic storage medium to produce a reflected light beam; and
    an alignment module, including a galvano mirror, configured to determine and correct an angular orientation of said photosensitive holographic storage medium based on said reflected light beam.

2. The system of claim 1, wherein said light source comprises a coherent light source and wherein said light beam comprises a coherent light beam.

3. The system of claim 1, wherein said alignment module comprises:
    a reflection sensor module configured to detect said reflected light beam, and to generate a signal representing a location of the reflected light beam on a sensor of said reflection sensor module.

4. The system of claim 3, wherein said alignment module further comprises:
    an orientation validator configured to determine said angular orientation of said storage medium based on the location of said reflected light beam on said sensor.

5. The system of claim 4, wherein said orientation validator is further configured to verify that said angular orientation of said storage medium is within operating tolerances for performing a desired operation in the holographic memory system.

6. The system of claim 5, wherein said orientation validator is further configured to adjust said angular orientation of said storage medium to an orientation within said operating tolerances.

7. The system of claim 3, wherein said reflected light beam is a small intensity reflection.

8. The system of claim 3, wherein said reflection sensor module comprises:
a focusing lens subsystem; and
a sensor positioned at the focal plane of said lens subsystem.

9. The system of claim 8, wherein said lens subsystem is configured to focus said reflected light beam into a focused light beam at a point on said sensor.

10. The system of claim 9, wherein said lens subsystem comprises:
at least one lens.

11. The system of claim 3, wherein said sensor comprises:
a camera.

12. The system of claim 3, wherein said system further comprises:
a mirror for preventing a non-reflected portion of said light beam from reaching said sensor.

13. The system of claim 12, wherein said mirror is adjusted to prevent a non-reflected portion of said light beam from reaching said sensor.

14. The system of claim 3, wherein said reflection sensor module comprises:
a polarizing beam splitter (PBS);
a quarter wave plate positioned between said storage medium and said PBS; and
a lens subsystem sequentially aligned between said storage medium and said sensor positioned at the focal plane of said lens subsystem configured to direct said reflected light beam to said sensor.

15. The system of claim 1, wherein said storage medium is defined by a plane which can rotate about an X-axis and/or about a Y-axis orthogonal to the X-axis, and wherein said alignment module can determine the angular orientation of said storage medium about the X-axis and the Y-axis based on said reflected light beam.

16. The system of claim 1, wherein said photosensitive holographic storage medium reflects approximately 4% or less of said light beam incident on said photosensitive holographic storage medium.

17. The system of claim 1, wherein said photosensitive holographic storage medium reflects approximately 0.5% to 1.0% of said light beam incident on said photosensitive holographic storage medium.

18. The system of claim 1, wherein said light beam is substantially transmitted through said photosensitive holographic storage medium to produce a transmitted light beam.

19. The system of claim 18, wherein said system further comprises:
a mirror for preventing said transmitted light beam from reaching said sensor.

20. The system of claim 19, wherein said mirror is adjusted to prevent said transmitted light beam from reaching said sensor.

21. The system of claim 19, wherein said mirror is adjusted to direct said transmitted light beam away from said photosensitive holographic storage medium.

22. The system of claim 19, wherein said mirror is a galvo mirror.

23. The system of claim 18, wherein said system further comprises:
a mirror for directing said transmitted light beam away from said photosensitive holographic storage medium.

24. An alignment module positioned in a holographic memory system having a photosensitive holographic storage medium therein comprising:
a reflection sensor module, including a galvano mirror, configured to detect a reflected non-coherent light beam partially reflected from said photosensitive holographic storage medium, the light beam incident on said photosensitive holographic storage medium, wherein said photosensitive holographic storage medium has an anti-reflective coating, and to generate a signal representing a location and correction of said reflected light beam on a sensor of said reflection sensor module.

25. The module of claim 24, wherein said alignment module further comprises:
an orientation validator which is configured to determine said angular orientation of said storage medium based on the location of said reflected light beam on said sensor.

26. The module of claim 25, wherein said orientation validator is further configured to verify that said angular orientation of said storage medium is within operating tolerances for performing a desired operation in the holographic memory system.

27. The module of claim 26, wherein said orientation validator is further configured to adjust said angular orientation of said storage medium to an orientation within said operating tolerances.

28. The module of claim 25, wherein said reflected light beam is a small intensity reflection.

29. The module of claim 25, wherein said reflection sensor module comprises:
a focusing lens subsystem; and
a sensor positioned at the focal plane of said lens subsystem.

30. The module of claim 29, wherein said lens subsystem is configured to focus said reflected light beam into a focused light beam at a point on said sensor.

31. The module of claim 30, wherein said lens subsystem comprises:
at least one lens.

32. The module of claim 25, wherein said reflection sensor module comprises:
a polarizing beam splitter (PBS);
a quarter wave plate positioned between said storage medium and said PBS; and
a lens subsystem sequentially aligned between said storage medium and said sensor positioned at the focal plane of said lens configured to direct said reflected light beam to said sensor.

33. The module of claim 24 wherein said sensor comprises:
a camera.

34. The module of claim 24, wherein said system further comprises:
a mirror for preventing a non-reflected portion of said light beam from reaching said sensor.

35. The module of claim 34, wherein said mirror is adjusted to prevent said non-reflected portion of said light beam from reaching said sensor.

36. The system of claim 24, wherein said photosensitive holographic storage medium reflects approximately 4% or less of said light beam incident on said photosensitive holographic storage medium.

37. The system of claim 24, wherein said photosensitive holographic storage medium reflects approximately 0.5% to 1.0% of said light beam incident on said photosensitive holographic storage medium.

38. The system of claim 24, wherein said light beam is substantially transmitted through said photosensitive holographic storage medium to produce a transmitted light beam.

39. The system of claim 38, wherein said system further comprises:

a mirror for preventing said transmitted light beam from reaching said sensor.

40. The system of claim 39, wherein said mirror is adjusted to prevent said transmitted light beam from reaching said sensor.

41. The system of claim 39, wherein said mirror is adjusted to direct said transmitted light beam away from said photosensitive holographic storage medium.

42. The system of claim 39, wherein said mirror is a galvo mirror.

43. The system of claim 38, wherein said system further comprises:
a mirror for directing said transmitted light beam away from said photosensitive holographic storage medium.

44. A method of operating a holographic memory system having a photosensitive holographic storage medium positioned therein comprising:
(a) generating a non-coherent light beam;
(b) reflecting a portion of said light beam from said photosensitive holographic storage medium, wherein said photosensitive holographic storage medium reflecting said portion of said light beam has an anti-reflective coating; and
(c) sensing and correcting, by use of a galvano mirror, an angular orientation of said storage medium based on said reflected light beam.

45. The method of claim 44, wherein said sensing step (c) comprises:
directing said reflected light towards an alignment module comprising:
a reflection sensor module configured to detect said reflected light beam, and to generate a signal representing a location of the reflected light beam on a sensor in said reflection sensor module; and
an orientation validator configured to determine the angular orientation of said storage medium based on the location information provided by said reflection sensor module.

46. The method of claim 45, further comprising:
verifying that said angular orientation of said storage medium is within operating tolerances for performing a desired operation in the holographic memory system.

47. The method of claim 46, further comprising:
adjusting said angular orientation of said storage medium to an orientation within said operating tolerances.

48. The method of claim 47, wherein said illuminating said storage medium with said one or more coherent light beams comprises:
generating a coherent light beam;
allocating said coherent light beam into two discrete light beams;
directing said two discrete light beams towards said storage medium.

49. The method of claim 48, wherein said sensing vibrations in said holographic memory system comprises:
detecting an interference pattern resulting from interference between one coherent light beam and a light beam diffracted by a hologram located in said storage medium.

50. The method of claim 49, wherein said hologram located in said storage medium is a vibration reference hologram.

51. The method of claim 47, wherein said method further comprises verifying that said storage medium has said vibration reference hologram stored therein before performing said sensing vibrations.

52. The method of claim 51, wherein said verifying that said storage medium has a vibration reference hologram stored therein comprises:
recording a vibration reference hologram to said storage medium if a vibration reference hologram is not found in said storage medium.

53. The method of claim 44, wherein said storage medium is defined by a plane which can rotate about an X-axis and/or about a Y-axis orthogonal to the X-axis, and wherein the angular orientation of said storage medium about the X-axis and the Y-axis is sensed based on said reflected light beam.

54. The method of claim 44, wherein said photosensitive holographic storage medium substantially transmits said light beam incident on said photosensitive holographic storage medium to produce a transmitted light beam.

55. The method of claim 44, wherein approximately 4% or less of said light beam incident on said photosensitive holographic storage medium is reflected from said photosensitive holographic storage medium during step (b).

56. The method of claim 44, wherein approximately 0.5% to 1.0% of said light beam incident on said photosensitive holographic storage medium is reflected from said photosensitive holographic storage medium during step (b).

57. A holographic memory system comprising:
a non-coherent light source configured to generate a light beam;
a photosensitive holographic storage medium configured to partially reflect said light beam incident on said photosensitive holographic storage medium to produce a reflected light beam and to substantially transmit said light beam incident on said photosensitive holographic storage medium to produce a transmitted light beam; and an alignment module, including a galvano mirror, configured to determine and correct an angular orientation of said photosensitive holographic storage medium based on said reflected light beam.

58. The system of claim 57, wherein said alignment module comprises:
a reflection sensor module configured to detect said reflected light beam, and to generate a signal representing a location of the reflected light beam on a sensor of said reflection sensor module; and
an orientation validator which configured to determine said angular orientation of said photosensitive holographic storage medium based on the location of said reflected light beam on said sensor.

59. The system of claim 57, wherein said photosensitive holographic storage medium has an anti-reflective coating.

60. The system of claim 57, wherein said photosensitive holographic storage medium reflects approximately 4% or less of said light beam incident on said photosensitive holographic storage medium.

61. The system of claim 57, wherein said photosensitive holographic storage medium reflects approximately 0.5% to 1.0% of said light beam incident on said photosensitive holographic storage medium.

62. The system of claim 57, wherein said system further comprises:
a mirror for preventing said transmitted light beam from reaching said sensor.

63. The system of claim 62, wherein said mirror is adjusted to prevent said transmitted light beam from reaching said sensor.

64. The system of claim 62, wherein said mirror is adjusted to direct said transmitted light beam away from said photosensitive holographic storage medium.

65. The system of claim 62, wherein said mirror is a galvo mirror.

66. The system of claim 57, wherein said system further comprises:

a mirror for directing said transmitted light beam away from said photosensitive holographic storage medium.

* * * * *